US012586362B2

(12) United States Patent
Wang et al.

(10) Patent No.: US 12,586,362 B2
(45) Date of Patent: Mar. 24, 2026

(54) METHOD AND APPARATUS WITH MULTI-MODAL FEATURE FUSION

(71) Applicant: Samsung Electronics Co., Ltd., Suwon-si (KR)

(72) Inventors: Hao Wang, Beijing (CN); Weiming Li, Beijing (CN); Qiang Wang, Beijing (CN); Jiyeon Kim, Suwon-si (KR); Hyun Sung Chang, Suwon-si (KR); Sunghoon Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 532 days.

(21) Appl. No.: 17/987,060

(22) Filed: Nov. 15, 2022

(65) Prior Publication Data

US 2023/0154170 A1 May 18, 2023

(30) Foreign Application Priority Data

Nov. 15, 2021 (CN) .......................... 202111348242.6
Sep. 2, 2022 (KR) ......................... 10-2022-0111206

(51) Int. Cl.
G06V 10/80 (2022.01)
G06T 7/50 (2017.01)
(Continued)

(52) U.S. Cl.
CPC .............. G06V 10/806 (2022.01); G06T 7/50 (2017.01); G06T 7/62 (2017.01); G06T 7/70 (2017.01);
(Continued)

(58) Field of Classification Search
CPC ........... G06V 10/806; G06T 7/50; G06T 7/62; G06T 7/70; G06T 17/00;
(Continued)

(56) References Cited

U.S. PATENT DOCUMENTS 11,921,824 B1 * 3/2024 Hester .................... G06N 3/045
2020/0363815 A1 11/2020 Mousavian et al.
(Continued)

FOREIGN PATENT DOCUMENTS

CN        111899301 A     11/2020
CN        112767466 A  *  5/2021    ............. G06N 3/044
CN        113012122 A      6/2021

OTHER PUBLICATIONS

"Liu, Attentive Cross-Modal Fusion Network for RGB-D Saliency Detection, 2021, IEEE, vol. 23, pp. 967-981" (Year: 2021).*
(Continued)

*Primary Examiner* — Oneal R Mistry
*Assistant Examiner* — Justin Philip Cascais
(74) *Attorney, Agent, or Firm* — NSIP Law

(57) ABSTRACT

A method, apparatus, electronic device, and non-transitory computer-readable storage medium with multi-modal feature fusion are provided. The method includes generating three-dimensional (3D) feature information and two-dimensional (2D) feature information based on a color image and a depth image, generating fused feature information by fusing the 3D feature information and the 2D feature information based on an attention mechanism, and generating predicted image information by performing image processing based on the fused feature information.

7 Claims, 18 Drawing Sheets

Generate 3D feature information and 2D feature information based on color image and depth image — S101

Generate fused feature information by fusing 3D feature information and 2D feature information based on attention mechanism — S102

Perform image processing based on fused feature information — S103

(51) Int. Cl.
　　*G06T 7/62*　　　(2017.01)
　　*G06T 7/70*　　　(2017.01)
　　*G06T 17/00*　　(2006.01)

(52) U.S. Cl.
　　CPC .... *G06T 17/00* (2013.01); *G06T 2207/10024*
　　　　(2013.01); *G06T 2207/10028* (2013.01); *G06T*
　　　　　　　　　　　　　*2207/20016* (2013.01)

(58) Field of Classification Search
　　CPC . G06T 2207/10024; G06T 2207/10028; G06T
　　　　　　　　　　　　　　　　2207/20016
　　See application file for complete search history.

(56)　　　　　　　References Cited

U.S. PATENT DOCUMENTS

| | | | | |
|---|---|---|---|---|
| 2022/0164597 A1* | 5/2022 | Ye | .......................... | G06V 20/58 |
| 2022/0410381 A1* | 12/2022 | Stoppi | ...................... | G06T 7/50 |
| 2023/0035475 A1* | 2/2023 | Cheng | ..................... | G01S 17/89 |
| 2024/0246240 A1* | 7/2024 | Teoh | ...................... | G06V 20/68 |

OTHER PUBLICATIONS

Zhao, Shanshan, et al. "Adaptive Context-Aware Multi-Modal Network for Depth Completion." IEEE Transactions on Image Processing 30, arXiv:2008.10833v1 [cs.CV] Aug. 25, 2020, (15 pages in English).

Srivastava, Siddharth, et al. "Self Attention Guided Depth Completion using RGB and Sparse LiDAR Point Clouds." 2021 IEEE/RSJ International Conference on Intelligent Robots and Systems (IROS). IEEE, Sep. 2021, (8 pages in English).

Liu, Di, et al. "Attentive Cross-Modal Fusion Network for RGB-D Saliency Detection." IEEE Transactions on Multimedia 23 (2021)(Published Apr. 2020): 967-981.

Tan, Xun, et al. "MBDF-Net: Multi-Branch Deep Fusion Network for 3D Object Detection." Proceedings of the 1st International Workshop on Multimedia Computing for Urban Data. Oct. 2021, (9 pages in English).

Sun, Yangjie, et al. "Deep Multimodal Fusion Network for Semantic Segmentation Using Remote Sensing Image and LiDAR Data." IEEE Transactions on Geoscience and Remote Sensing 60, 2022 (Published Sep. 2021), (18 pages in English).

Extended European search report issued on Feb. 22, 2023, in counterpart European Patent Application No. 22207194.6 (10 pages in English).

Li, Yi, et al. "DeepIM: Deep iterative matching for 6D pose estimation." *Proceedings of the European Conference on Computer Vision (ECCV)*. (2018). pp 1-16.

Chen, Wei, et al. "FS-NET: Fast shape-based network for category-level 6D object pose estimation with decoupled rotation mechanism." *Proceedings of the IEEE/CVF Conference on Computer Vision and Pattern Recognition*. (2021). pp 1581-1590.

He, Yisheng, et al. "FFB6D: A full flow bidirectional fusion network for 6D pose estimation." *Proceedings of the IEEE/CVF Conference on Computer Vision and Pattern Recognition*. (2021). pp 3003-3013.

Prakash, Aditya, et al. "Multi-modal fusion transformer for end-to-end autonomous driving." *Proceedings of the IEEE/CVF Conference on Computer Vision and Pattern Recognition*. (2021). pp 7077-7087.

Wang, Yue, et al. "Dynamic graph cnn for learning on point clouds." *Acm Transactions On Graphics (tog)* vol. 38. Issue 5 (2019). pp 1-12.

Hu, Haotian, et al. "VA-GCN: A vector attention graph convolution network for learning on point clouds." arXiv preprint arXiv:2106.00227v1 (2021). pp 1-12.

Carion, Nicolas, et al. "End-to-end object detection with transformers." arXiv:2005.12872v3 (2020). pp 1-26.

Vaswani, Ashish, et al. "Attention is all you need." *Advances in neural information processing systems* vol. 30 (2017). pp 1-11.

* cited by examiner

Terminal 100

Communication

Server 200

METHOD AND APPARATUS WITH MULTI-MODAL FEATURE FUSION

CROSS-REFERENCE TO RELATED APPLICATIONS

This application claims the benefit under 35 USC § 119(a) of Chinese Patent Application No. 202111348242.6 filed on Nov. 15, 2021, in the China National Intellectual Property Administration, and Korean Patent Application No. 10-2022-0111206 filed on Sep. 2, 2022, in the Korean Intellectual Property Office, the entire disclosures of which are incorporated herein by reference for all purposes.

BACKGROUND

1. Field

The following disclosure relates to a method and apparatus with multi-modal feature fusion.

2. Description of Related Art

In image processing technologies, typically, only information of a single modality is used for image processing. If information of a single modality is used, the accuracy of the image processing result may be reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method performed by a computing apparatus includes generating three-dimensional (3D) feature information and two-dimensional (2D) feature information based on a color image and a depth image, generating fused feature information by fusing the 3D feature information and the 2D feature information based on an attention mechanism, generating predicted image information by performing image processing based on the fused feature information.

The fused feature information may be generated by fusing the 3D feature information of at least one scale and the 2D feature information of at least one scale.

The generating of the fused feature information may include, for the 3D feature information of one scale and the 2D feature information of one scale, generating fused feature information of a current scale by performing a feature fusion on 3D feature information of the current scale and 2D feature information of the current scale based on the attention mechanism, where the 3D feature information of the current scale may be determined based on fused feature information of a previous scale and 3D feature information of the previous scale, and the 2D feature information of the current scale may be determined based on 2D feature information of the previous scale.

The generating of the fused feature information may include acquiring point cloud voxel feature information and/or voxel position feature information based on the 3D feature information, generating first image voxel feature information based on the 2D feature information, and generating fused feature information by fusing features according to the point cloud voxel feature information, the voxel position feature information, and/or the first image voxel feature information, based on the attention mechanism.

The generating of the fused feature information by fusing the features according to the point cloud voxel feature information, the voxel position feature information, and/or the first image voxel feature information, based on the attention mechanism may include one of: generating the fused feature information by fusing features using a cross-attention mechanism, for the first image voxel feature information and feature information output after processing the voxel position feature information, the point cloud voxel feature information, and the first image voxel feature information based on the attention mechanism; generating the fused feature information by fusing features using the cross-attention mechanism, for the first image voxel feature information and the feature information output after processing the point cloud voxel feature information based on the attention mechanism; generating the fused feature information by fusing features using a self-attention mechanism, for the first image voxel feature information and the feature information output after processing the point cloud voxel feature information based on the cross-attention mechanism; or generating the fused feature information by fusing features for feature information output after processing the first image voxel feature information based on the self-attention mechanism, and the feature information output after processing the point cloud voxel feature information and the first image voxel feature information based on the cross-attention mechanism.

The performing of the image processing based on the fused feature information may include at least one of performing a pose estimation and/or a size estimation based on the fused feature information, or performing a shape reconstruction and/or segmentation based on the fused feature information.

The performing of the shape reconstruction and/or segmentation based on the fused feature information may include generating shape information and/or segmentation information by performing the shape reconstruction and/or segmentation.

In one general aspect, embodiments include a non-transitory computer-readable storage medium storing instructions that, when executed in one or more processors of a computing apparatus, configure the one or more processors to perform any one, any combination, or all operations and/or methods described herein.

In one general aspect, an apparatus includes one or more processors configured to execute instructions, one or more memories storing the instructions, which when executed by the one or more processors configure the one or more processors to generate three-dimensional (3D) feature information based on a depth image, generate two-dimensional (2D) feature information based on a color image, fuse the 3D feature information and the 2D feature information using an attention mechanism, and predict image information based on the fused feature information.

For the fusing of the 3D feature information and the 2D feature information, the one or more processors may be configured to fuse the 3D feature information of at least one scale and the 2D feature information of at least one scale.

For the prediction of the image information, the one or more processors may be configured to generate point cloud voxel feature information and/or voxel position feature information based on the 3D feature information, generate first image voxel feature information based on the 2D feature information, and generate fused feature information by fusing features according to the point cloud voxel feature information, the voxel position feature information, and/or the first image voxel feature information, based on the attention mechanism.

For the prediction of the image information, the one or more processors may be configured to perform at least one of a pose estimation and/or a size estimation based on the fused feature information, or a shape reconstruction and/or segmentation based on the fused feature information.

The apparatus may be an AR device that may further include one or more cameras configured to respectively capture the depth image and the color image, and may include one or more displays to display AR image information based on the predicted image information.

In one general aspect, an apparatus includes one or more processors configured to execute instructions, and one or more memories storing the instructions, which when executed by the one or more processors, configure the one or more processors to extract first feature information through a multiple scale encoding with respect to first information obtained through a first modality, extract second feature information through a multiple scale encoding with respect to second information obtained through a second modality different from the first modality, and generate fused features using a multi-scale attention mechanism of a fusion transformer model that includes a single modality attention mechanism and a multi-modality attention mechanism.

The extraction of the first feature information may include extraction of 3D feature information through multiple scale encoding with respect to a 3D point cloud, and the extraction of the second feature information may include extraction of 2D feature information through a multiple scale encoding with respect to 2D image information.

The generation of the fused features may include provision, for each of plural scales, corresponding scale extracted 3D feature information to a self-attention model of the transformer model and results of the self-attention model and corresponding scale extracted 2D feature information to a cross-attention model of the transformer model.

The one or more processors may be further configured to predict 6D pose information for an object based on the fused features, and project the object into 3D space of a user using the 6D pose information.

The generation of the fused features may further include a splicing of fused features of a previous scale with currently fused features of a current scale.

The apparatus may further include a display and/or one or more cameras to respectively capture a depth image as the first modality and a color image as the second modality, and one or more displays to display image information based on predicted image information, and the one or more processors may be further configured to generate the predicted image information based on the fused features.

The predicted image information may include 6-Dimensional (6D) pose information of an object and/or size information of the object.

Other features and aspects will be apparent from the following detailed description, the drawings, and the claims.

Figure 1:
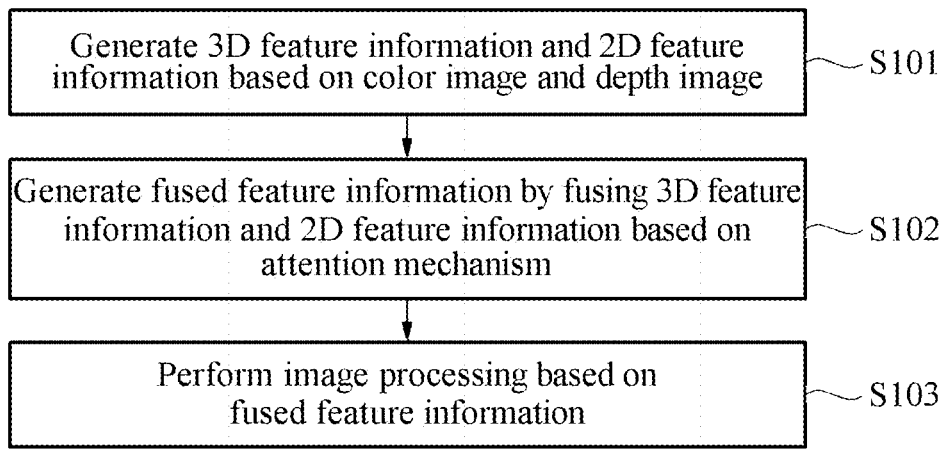
FIG. 1 is a flowchart illustrating an example image processing method, according to one or more embodiments.

Throughout the drawings and the detailed description, unless otherwise described or provided, the same drawing reference numerals may be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third", or A, B, (a), (b), and the like may be used herein to describe various members, components, regions, layers, portions, or sections, these members, components, regions, layers, portions, or sections are not to be limited by these terms. Each of these terminologies is not used to define an essence, order, or sequence of corresponding members, components, regions, layers, portions, or sections, for example, but used merely to distinguish the corresponding members, components, regions, layers, portions, or sections from other members, components, regions, layers, portions, or sections. Thus, a first member, component, region, layer, portions, or section referred to in the examples described herein may also be referred to as a second member, component, region, layer, portions, or section without departing from the teachings of the examples.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof. However, the use of the term "may" herein with respect to an example or embodiment, e.g., as to what an example or embodiment may include or implement, means that at least one example or embodiment exists where such a feature is included or implemented, while all examples are not limited thereto.

Unless otherwise defined, all terms used herein including technical or scientific terms have the same meaning as commonly understood by one of ordinary skill in the art to which examples belong and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

As referred to herein, Artificial intelligence (AI) is a technology implemented by hardware and examples herein involve technological improvements of hardware implementations of previous approaches. The hardware may be a computer or processor, i.e., a computing apparatus as a machine that is configured to perform processing operations as or including one or more processors or other processing hardware. The computing apparatus is configured to perform processing operations, including such AI processing operations, or configured to control implementation of the same or some of the same by the computing apparatus in cooperation with other computing apparatuses configured to implement the same or some of the same, to computationally, e.g., through automated computer operation, accurately infer information of an environment and/or information with respect to other information obtained, received, or generated by the computer, for example.

Example computers herein may implement AI operations described herein using an example sensor, dedicated AI chip, cloud computing, distributed storage, big data processing hardware, and an operating/interaction system, as non-limiting examples. In an example, a computing apparatus example and may further provide electromechanical integration to control or perform electromechanical operations dependent on results of such operations. Examples herein may include processing operations in a computer vision (CV) technology, using machine learning/deep learning. Additionally, while descriptions herein apply to computer vision technologies involving appearance and geometrical information, e.g., respective 2D image and 3D depth information, examples are not limited thereto.

Examples herein may include camera(s), e.g., one or more of each of a color camera, a depth camera, and/or a combined color-depth camera, and the example computer to perform machine vision, and include image processing operations such as recognition, tracking, and measurement on a target, and may further include graphic processing, where the computer may process or render such a target as image information displayed to a user, and/or may provide or transmit such image information to another computer for detection. In an example, AI models herein may obtain or generate information from images and/or other multidimensional data. Further, example image processing operations herein may further include image recognition, image semantic understanding, image retrieval, optical character recognition (OCR), video processing, video semantic understanding, video content/behavior recognition, three-dimensional (3D) object reconstruction, a 3D technology, virtual reality (VR), augmented reality (AR), synchronous positioning, map construction, autonomous driving, and/or smart transportation. Example image processing operations may further include general feature recognition technologies such as face recognition and/or fingerprint recognition.

With respect to examples where the image processing includes AR processing, example image processing methods may include any one, any combination, or all of AR image recognition, object recognition, image segmentation, and 6D pose estimation. For example, in an AR embodiment, virtual content may be added to a real scenario, where the computing apparatus is an AR computing apparatus, e.g., in front of a user, to provide the user with a real-world scenario experience.

To implement system processing based on an AR technology in a 3D space, typically high-precision real-time processing and understanding of a 3D state of surrounding objects may be required to show a high-quality VR fusion effect in front of a user. However, typically, only image data of a single modality is used for image processing. For example, only depth images may have been used for a 6D pose estimation, whereas RGB images may have been used only for an object detection. In such approaches, example limitations have been imposed on such image processing such as sensor noise, object occlusion, and the like. For example, based on such limitations and limits of singular modality approaches, a predicted pose may be blurred. Also, in typical image processing, a shape change within a class may often lead to inaccurate prediction and positioning of an object.

Examples of the present disclosure may include visual information processing methods and computing apparatuses, electronic devices, and non-transitory computer-readable storage media, for example. For example, when an image including color and depth information are provided for image processing in various examples, an efficiency and robustness of a system may be improved in the example AR related embodiments compared to previous AR approaches. In addition, in examples when color features and depth features are simultaneously fused, a recognition operation of an implemented image processing model for 3D information may be enhanced. This may include enhanced smooth processing of changes in shapes and sizes of class-level objects.

Figure 2:
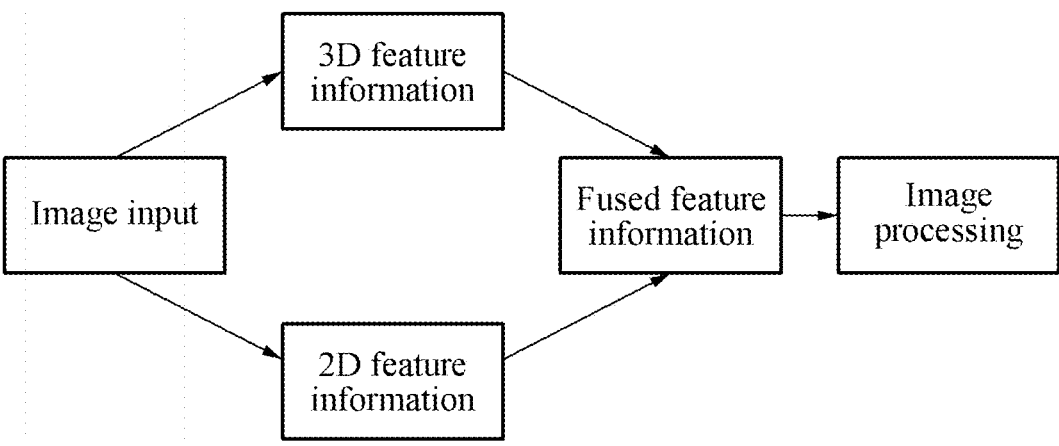
FIG. 2 illustrates an example image processing method, according to one or more embodiments.
Figure 11A:
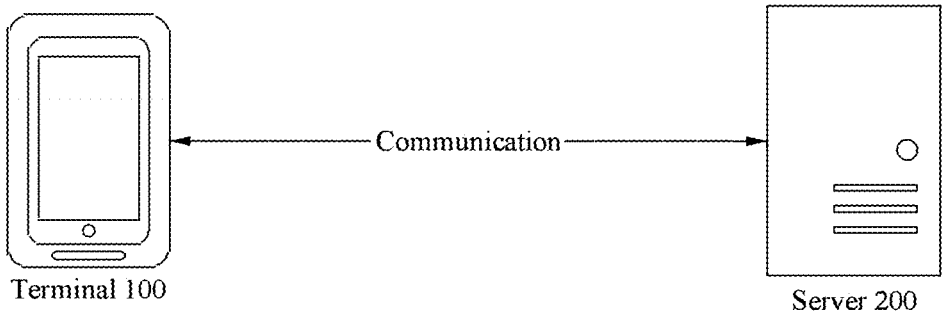
FIG. 11A illustrates an example operating environment, according to one or more embodiments.

FIG. 1 is a flowchart illustrating an example image processing method, according to one or more embodiments. FIG. 2 illustrates an example image processing method, according to one or more embodiments. These image processing methods may be the same or different methods, and may be performed by various different electronic devices. For example, as non-limiting examples, such electronic devices may include a user terminal 100 or a server 200, such as shown in FIG. 11A. The user terminal 100 may include, for example, a smartphone, a tablet computer, a notebook computer, a desktop computer, a smart speaker, a smartwatch, an in-vehicle device, an AR device, and the like, as non-limiting examples. The server 200 may be an independent physical server, or a server cluster or distributed system including multiple physical servers, or may be a cloud server that may provide a basic cloud computing service such as a cloud service, a cloud database, cloud computing, a cloud function, cloud storage, a network service, a cloud communication, a middleware service, a domain name service, a security service, a content delivery network (CDN), big data, and an AI platform, as non-limiting examples. In an example with plural user terminals 100, the user terminals 100 may communicate with each other, in an example with plural servers 200, the servers 200 may communicate with each other, and in an example one or more user terminals 100 and one or more servers 200 may communicate with each other.

For example, as shown in FIG. 1, the image processing method may include operations S101 through S103.

In operation S101, 3D feature information and two-dimensional (2D) feature information may be generated based on a color image and a depth image.

Figure 11B:
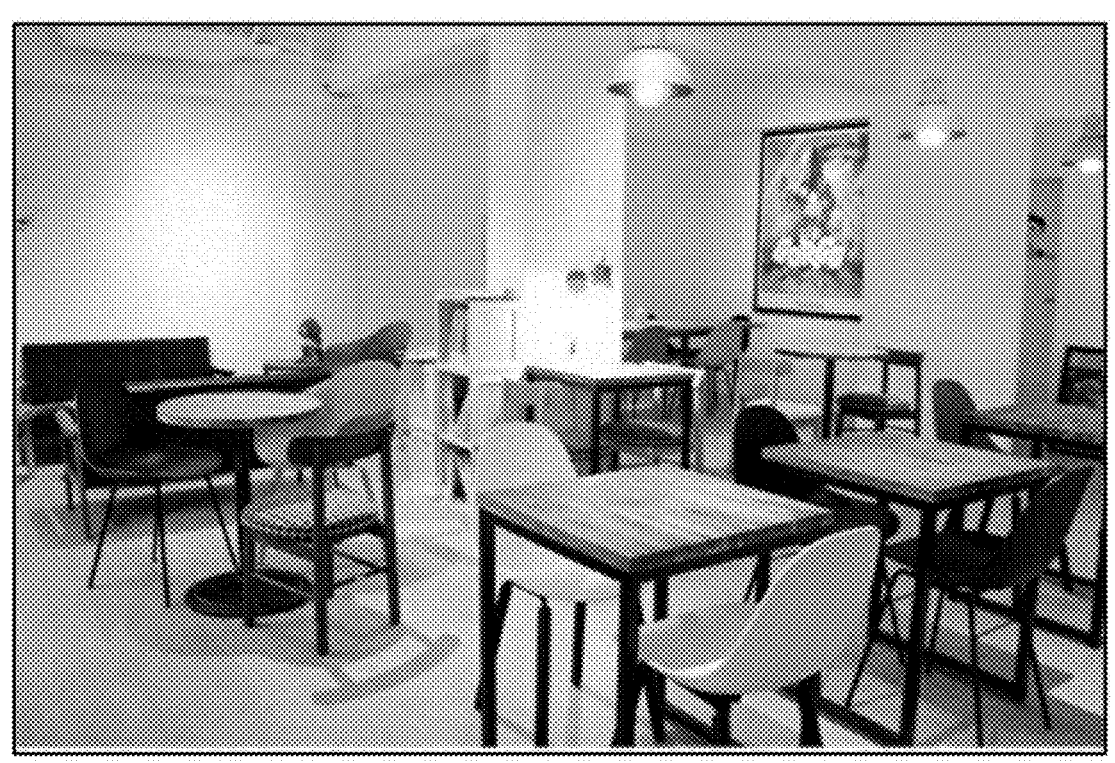
FIG. 11B illustrates an example input image, according to one or more embodiments.

The color image and the depth image may be, for example, images respectively corresponding to depth information and color information included in one input image. An input image may be a depth image with colors, such as an RGB-D image in which a color image (i.e., RGB images) and a depth image are superimposed, or an image in which a grayscale image and a depth image are superimposed. Here, an example of the input image is shown in FIG. 11B.

Figure 3A:
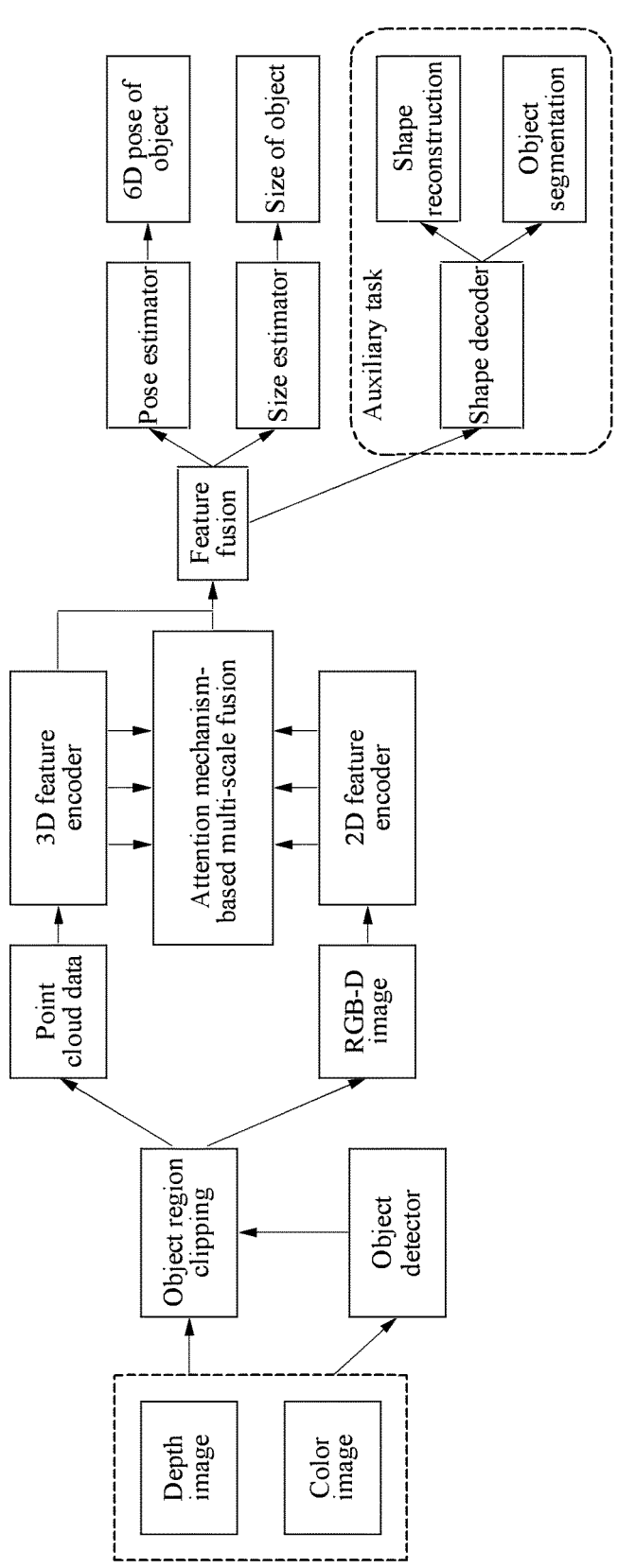
FIG. 3A illustrates an example estimating of a 6D pose and a size of an object based on a category level of a color image and a depth image, according to one or more embodiments.
Figure 3B:
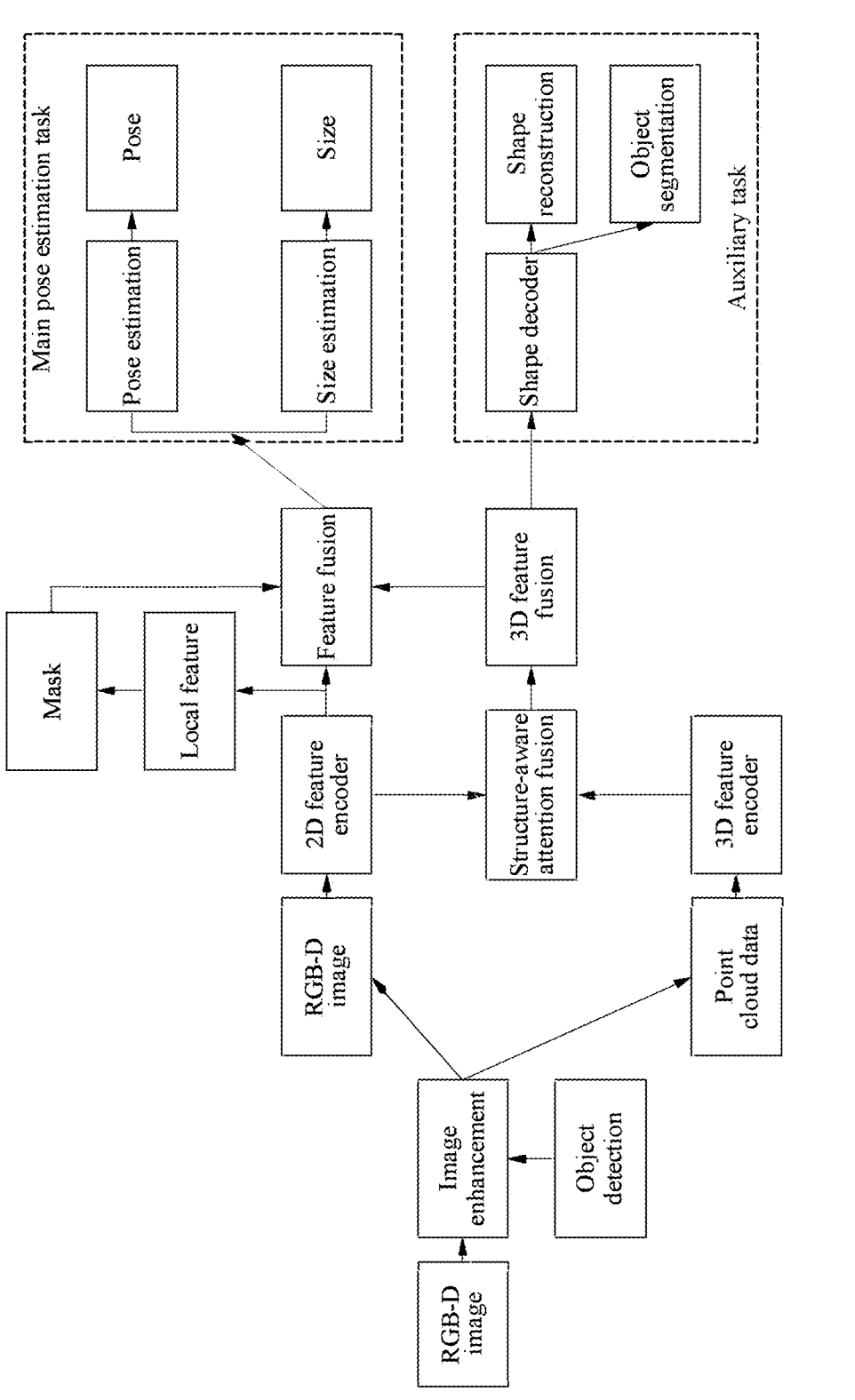
FIG. 3B illustrates an example image processing method based on a color image and a depth image, according to one or more embodiments.

3D feature information may be extracted from the RGB-D image, such as illustrated in FIG. 3B, or extracted based on a depth image, and 2D feature information may be extracted from the RGB-D image, such as illustrated in FIG. 3B, or extracted based on a color image or a grayscale image. For example, as illustrated in FIG. 3A, the input image may be detected by an object detector to obtain an object region, and a color image and a depth image including an object may be obtained by clipping depth and color images of a corresponding object region, e.g., resulting in the point cloud data and RGB-D of FIG. 3A. In an example, as illustrated in FIG. 3B, the point cloud data and an enhanced RGB-D, based on such object detection, may be extracted from a provided RGB-D image.

To extract an image feature, a feature extraction process extracts features from a lower layer of a feature extraction model/network to features extracted from a higher layer of the feature extraction network/model. In an example, such lower layer and higher layer extracted features may be simultaneously used by multi-scale attention-based fusion networks/models described herein. As shown in FIG. 11B, a feature extracted from a lower layer of the feature extraction network may be a contour feature of the illustrated table, e.g., an edge. As the feature extraction network deepens, respective levels of feature information of the extracted features, such as table legs and table drawers, may increase. Features of different scales may refer to features extracted at different scales of the network. In an example, such different scales may respectively correspond to respective filtering results of different receptive field sizes. For example, the respective filtering results may be from a large or entire image receptive field size to a small or single pixel receptive field size respectively by an initial feature filtering layer of the feature extraction network/model to a corresponding final feature filtering layer, such as from a corresponding first convolutional layer to a corresponding final convolutional layer. In various examples, when an image feature is extracted, 3D feature information and 2D feature information of a single scale may be processed, or 3D feature information and 2D feature information of multiple scales may be processed.

In operation S102, fused feature information may be generated by fusing the 3D feature information and the 2D feature information based on an attention mechanism.

Feature information fusion processing may include merging a single modality feature extracted from an image to a multimodality feature that is more discriminative than an input feature. In an example, the attention mechanism may be adopted to realize a fusion of 3D feature information and 2D feature information. In the fused feature information generated by fusing 3D feature information and 2D feature information, an influence of defects inherent in a single modality feature may be reduced due to complementarity aspects between the 3D feature information and the 2D feature information.

In an example, when 3D feature information and 2D feature information of multiple scales are extracted, the fused feature information generated by a multi-scale fusion may be referred to herein as feature information of the multi-scale fusion.

In operation S103, image processing may be performed based on the fused feature information.

Figure 11C:
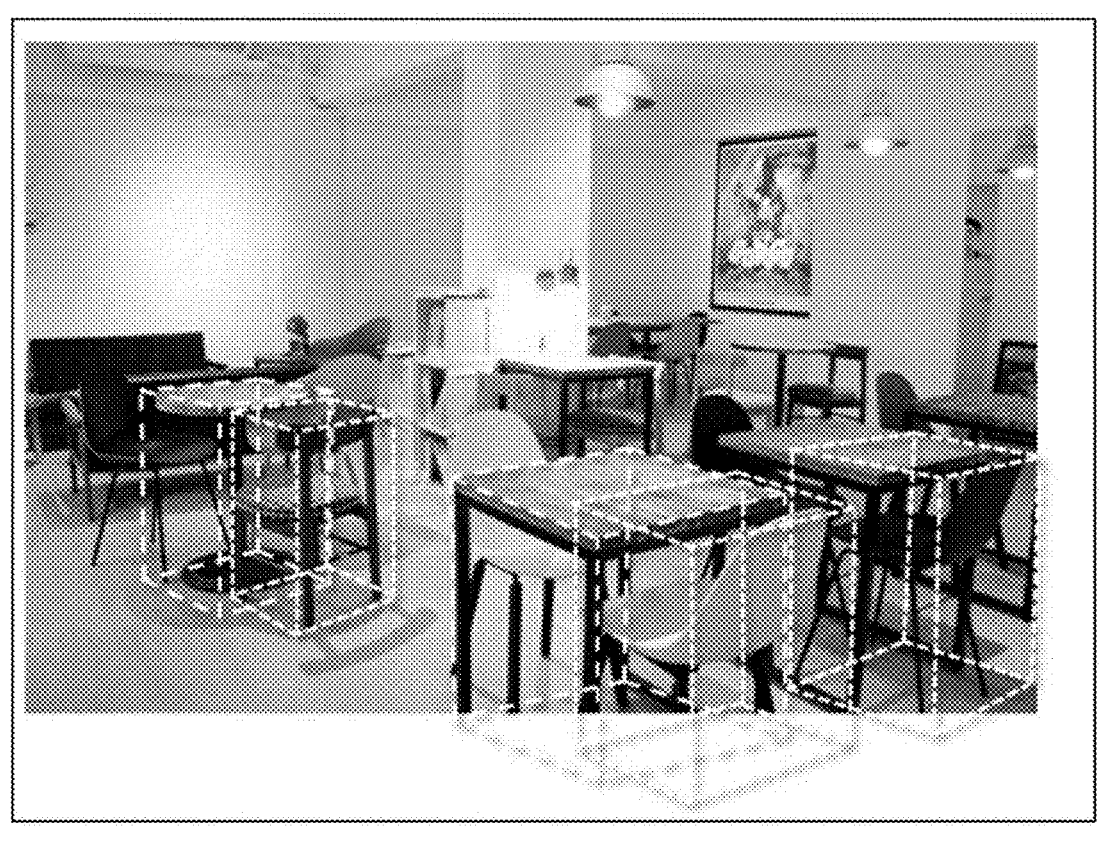
FIG. 11C illustrates an example image processing result, according to one or more embodiments.

Without an accurate 3D model, it may be difficult to perform image processing for a desired/intended image processing result. Rather, with examples herein an accurate 3D model may be predicted through such image processing. For example, the image processing based on the fused feature information may be efficiently performed for a real complex application scenario (in an example, RGB-D data of a model that may not require a known object to perform an accurate AR interaction in a real scenario may be used). As shown in FIG. 11C, in an example, a virtual object rendered in an example AR device or system may be controlled based on a result image obtained after image processing by an example image processing method, and accordingly a real object and a virtual object may be visualized as having a real and natural interaction.

It is also found herein that it may be possible to have such an efficient processing capability in an example mobile platform that may have limited computing storage resources and/or energy resources by fully utilizing an example fusion of 3D features and 2D features that may satisfy desirabilities of accuracy and robustness in terms of 3D object processing and understanding within the mobile platform.

In an example image processing method, an Attention-guided RGB-D Fusion network (also referred to herein as ARF-Net) for fusing multi-modality information using a transformer mechanism is provided. For example, the ARF-Net may adaptively fuse 2D features (e.g., features extracted from RGB images) and 3D features (e.g., 3D features extracted from depth images or point clouds) through an attention mechanism, and may identify shapes of different instances by searching for structural features. The ARF-Net may fuse RGB features and point cloud features, and may provide an improved performance, through various feature extractors or extraction operations, over previous approaches.

In an example, operation S101 of generating the 3D feature information and the 2D feature information of at least one scale of the input image may include the below example operations A1 and A2.

In operation A1, an input depth image may be converted to point cloud feature information of a 3D space, and encoding may be performed based on the point cloud feature information, to generate 3D feature information of at least one scale.

For example, as shown in FIG. 3A, a depth image may be converted to point cloud feature information (referred to as "point cloud data") of a 3D space. In an example, the depth image combined with (or dependent on) camera internal parameters may be converted to the point cloud feature information. Furthermore, the point cloud feature information may be used as an input of a 3D feature encoder, and 3D feature information may be generated through processing of the 3D feature encoder.

3D feature information may be obtained using a 3D feature extraction network (3D feature encoder) such as a multilayer perceptron (MLP) network encoder or a 3D voxel network, and a 3D feature vector corresponding to each point may be extracted. The 3D feature extraction network may extract 3D structural features of a depth image in the 3D space. In an example, the MLP network encoder may include a fully-connected feedforward network.

In operation A2, 2D feature information of at least one scale may be generated by performing encoding based on the input color image or color-depth image.

For example, as shown in FIG. 3A, as a non-limiting example, one of a color image, a grayscale image, a color depth image, and a grayscale depth image may be used as an input of a 2D code feature encoder, and 2D feature information may be generated by the 2D code feature encoder. The 2D code feature encoder may be implemented as a deep convolutional neural network, and 2D features of the input image may be extracted by the 2D code feature encoder.

Figure 3C:
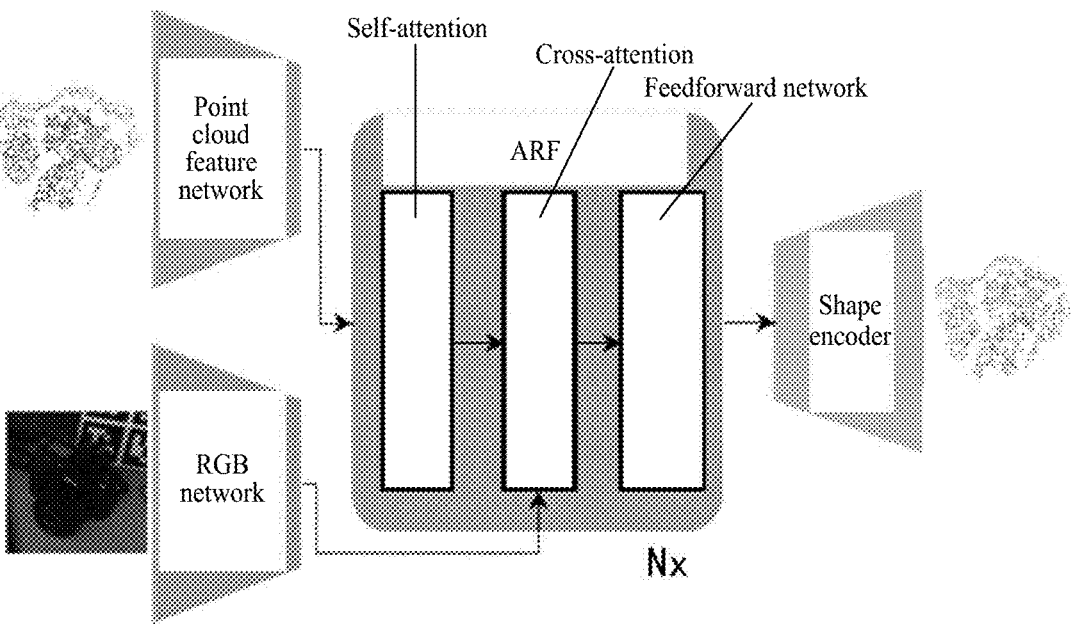
FIG. 3C illustrates an example attention-guided RGB-D fusion network (ARF-Net), according to one or more embodiments.
Figure 3D:
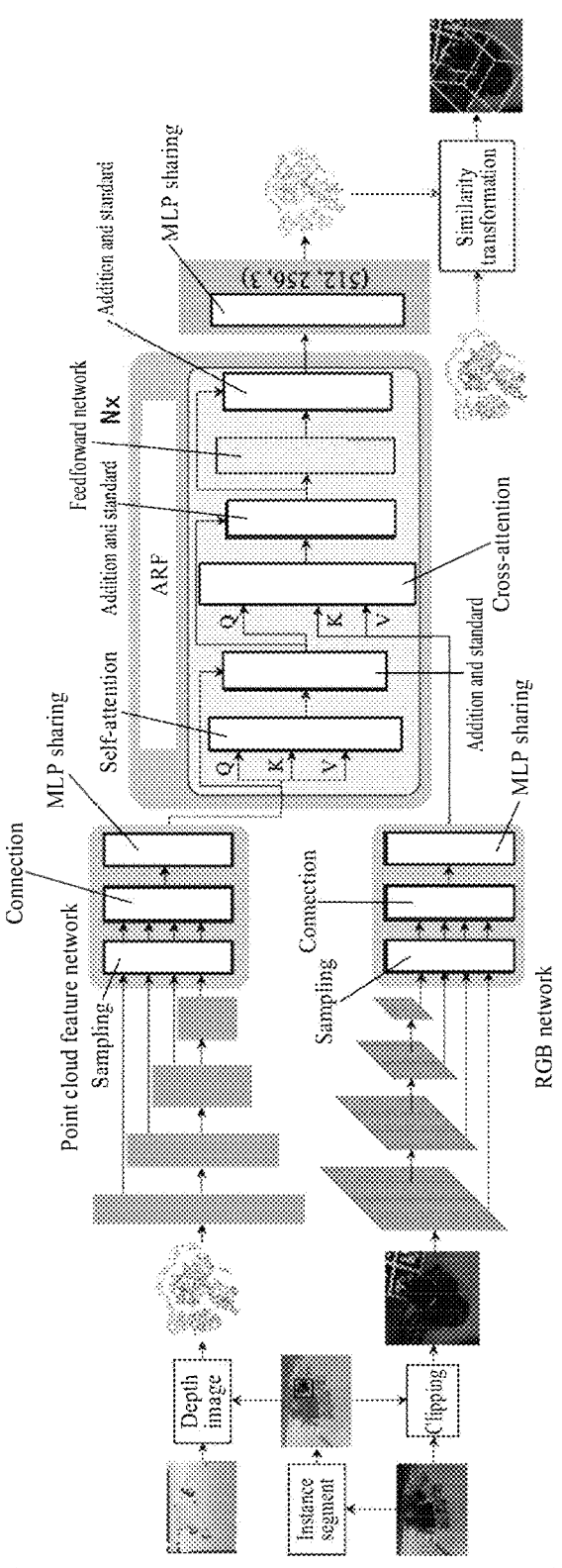
FIG. 3D illustrates an example of an ARF-Net, according to one or more embodiments.

In an example of an aligned RGB-D scenario, e.g., where an RGB-D image is obtained or provided of generated by a camera attached to or of the computing apparatus, an instance segmentation scheme may be used to detect and segment object instances. A data pair of point cloud data of an instance calculated based on masked depth information and camera internal parameters, by an RGB image of the instance cropped by an object bounding box may be used as an input of the ARF-Net. As shown in FIGS. 3C and 3D, the ARF-Net may extract RGB features using a convolutional neural network (RGB network), and extract point cloud features using a point cloud feature network. Features of two modalities may be fused using one or more ARF models, and accordingly a capability of the network to learn a standard (e.g., normalized) shape of an object may be further enhanced. An appearance feature of an object may be adaptively fused with a geometric feature of the object, based on the fusion model. In a shape decoding operation, a normalized object coordinate space (NOCS) using generated fused feature information as an input may be reconstructed using an MLP-based decoder. In an example, the MLP-based decoder may include fully-connected layer(s). A 6D pose and size of an object may be obtained by matching predicted NOCS coordinates to an observation point using a similarity transformation such as a Umeyama algorithm.

As shown in FIG. 3A, in an example, the 3D feature information extracted by the 3D feature encoder and the 2D feature information extracted by the 2D feature encoder may be input to an attention mechanism-based multi-scale fusion model, to realize a feature fusion and output fused feature information. In an example, fused feature information may be generated by fusing 3D feature information of at least one scale and 2D feature information of at least one scale based on the attention mechanism.

Figure 4:
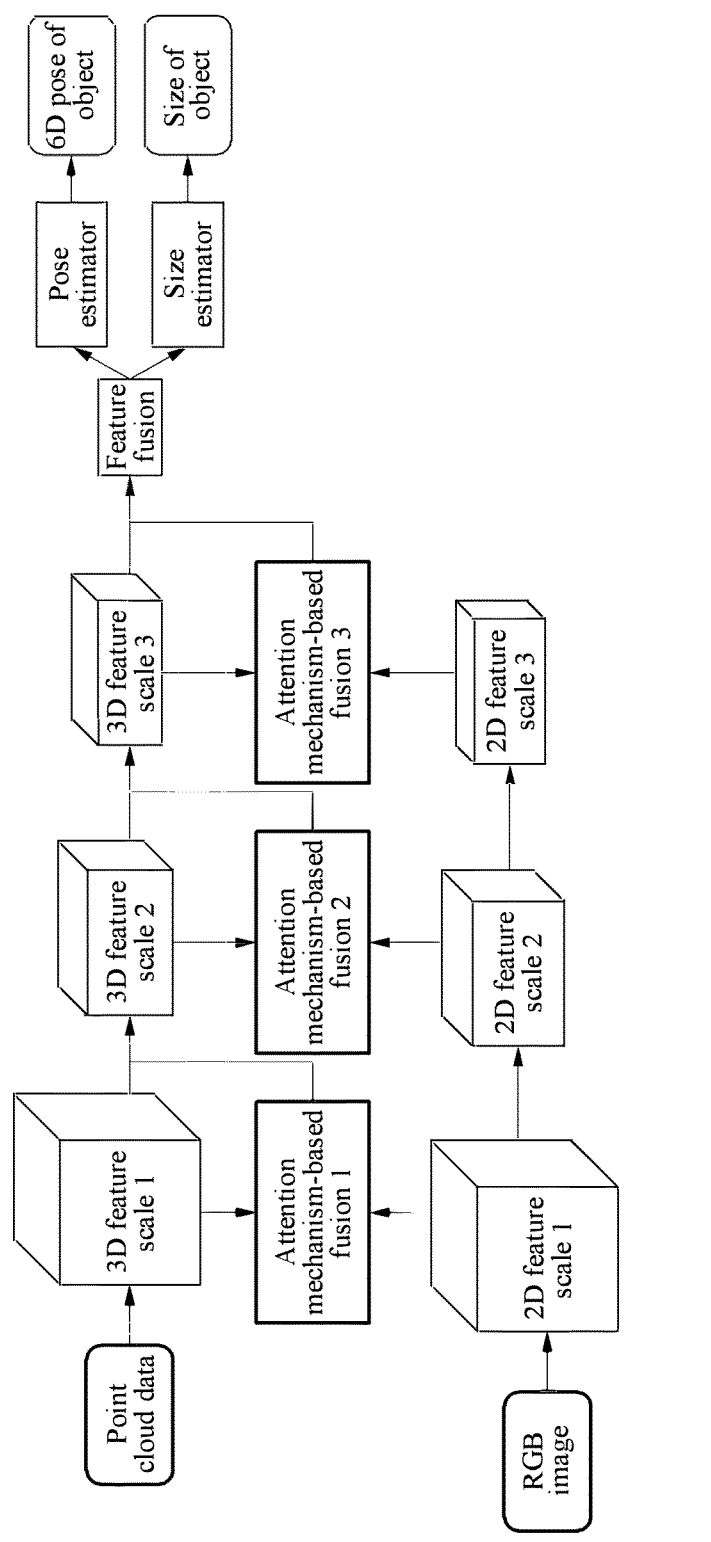
FIG. 4 illustrates an example estimating of a pose of an object based on a multi-scale fusion of an attention mechanism, according to one or more embodiments.

In an example, as shown in FIG. 4, operation S102 of generating the fused feature information by fusing the 3D feature information and the 2D feature information based on the attention mechanism may include operation B1.

Operation B1 may be performed on 3D feature information and 2D feature information of an arbitrary scale. In operation B1, 3D feature information of a current scale and 2D feature information of the current scale may be fused using an attention mechanism-based fusion model to generate fused feature information.

The 3D feature information of the current scale may be determined based on fused feature information of a previous scale and 3D feature information of the previous scale, and the 2D feature information of the current scale may be determined based on 2D feature information of the previous scale.

For example, fusing of features of multiple scales may be fusing of 3D feature information and 2D feature information that are individually extracted at different scales. With an attention mechanism-based fusion scheme being adopted, the multi-scale fusion may be implemented in a cascade manner, e.g., through different scale attention mechanism-based fusion models. In an example, fused features of each scale may be spliced with 3D feature information of a previous scale, and may be used as an input of a 3D feature encoder of a next scale. 2D feature information of the previous scale may be used as an input of a 2D feature encoder of the next scale.

In an example, first 3D feature information at scale 1 may be extracted based on point cloud data, first 2D feature information at the scale 1 may be extracted based on a color image, and first fused feature information may be generated by fusing the first 3D feature information and the first 2D feature information using an attention mechanism-based fusion 1 model.

In addition, second 3D feature information at scale 2 may be generated based on the first 3D feature information and the first fused feature information, second 2D feature information at the scale 2 may be extracted based on the first 2D feature information, and second fused feature information may be generated by fusing the second 3D feature information and the second 2D feature information using an attention mechanism-based fusion 2 model.

Also, using an attention mechanism-based fusion 3 model, third 3D feature information at scale 3 based on the second 3D feature information and the second fused feature information may be extracted, third 2D feature information at the scale 3 generated based on the second 2D feature information may be extracted, and third fused feature information (e.g., as finally generated fusion feature information) may be generated by fusing the third 3D feature information and the third 2D feature information.

In an example, operation S102 of generating the fused feature information by fusing the 3D feature information and the 2D feature information based on the attention mechanism may include operations B2 through B4.

In operation B2, point cloud voxel feature information and/or voxel position feature information may be generated based on the 3D feature information.

For example, the 3D feature information may be directly voxelized and converted into point cloud voxel feature information.

Figure 5:
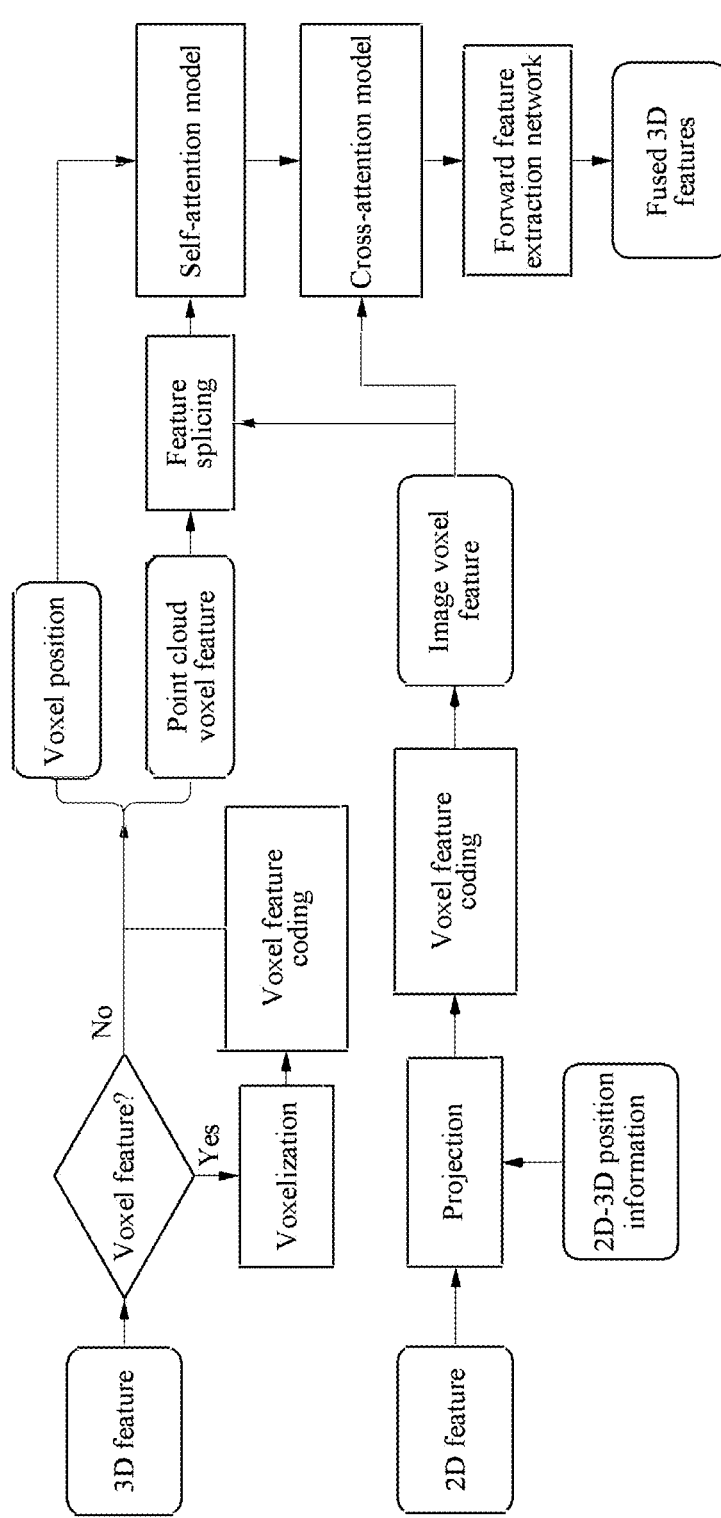
FIG. 5 illustrates an example fusing of depth features based on an attention mechanism, according to one or more embodiments.

As another example, FIG. 5 demonstrates that whether the 3D feature information is a voxel feature may be determined first. If the 3D feature information is determined to be the voxel feature, voxelization may be performed, and voxel position feature information and point cloud voxel feature information may be generated through voxel feature coding. If the 3D feature information is not the voxel feature, a direct conversion into voxel position feature information and point cloud voxel feature information may be performed based on the 3D feature information. Here, a voxel stands for a volume pixel. Voxelization refers to converting a geometric representation of an object to a voxel representation closest to the object.

In operation B3, first image voxel feature information may be generated based on the 2D feature information.

For example, since RGB-D images are aligned, image pixels and 3D points of a point cloud may be in a one-to-one positional relationship. Accordingly, image voxel feature information may be obtained by projecting 2D feature information (image features) to a voxel space coincident with the point cloud based on a known 2D-3D positional relationship.

In operation B4, the fused feature information may be generated by fusing features according to the point cloud voxel feature information, the voxel position feature information, and/or the first image voxel feature information, based on the attention mechanism.

For example, by using the point cloud voxel feature information, the first image voxel feature information, and the voxel position feature information as inputs of a self-attention model, fusion processing of feature information may be implemented through the attention mechanism.

In an example, based on an appearance feature of RGB and a geometric feature of the point cloud, the ARF-Net may set a correlation between RGB features and point cloud features using a cross-attention model. For example, the cross-attention model may adaptively select a determined representative feature through a correlation calculation of a cross-modality to enhance a corresponding point cloud feature. The ARF-Net may use the self-attention model to extract an inner space relationship between object point clouds and describe a global spatial structure relationship between local objects.

For example, the ARF-Net may obtain structure-aware geometric features with the self-attention model, and obtain relational fused RGB features with the cross attention model. A corresponding multi-modal attention mechanism-based fusion model, e.g., including the self-attention model and the cross-attention model, may be used alone, or multiple such multi-modal attention mechanism-based fusion models may be concurrently used.

For structure-aware point cloud features, a dependency between point clouds may be established using the self-attention model. To collect multi-scale point cloud features, low-level multi-scale point cloud features may be upsampled to the same resolution, and feature splicing may be performed as demonstrated in FIG. 5. As shown in FIGS. 3C and 3D, after multi-scale features are spliced, an MLP may be used to compress a feature dimension to a fixed feature dimension. The MLP may also be demonstrated in FIG. 5 as the forward feature extraction network/model. In an example the MLP may include fully-connected feedforward network(s).

Here, the self-attention model may use the point cloud features as inputs, and generate a query, a key, and a value by performing a projection through a linear operation. For example, the self-attention model may be Query-Key-Value (QKV) attention model expressed according to the below Equations 1 to 4.

$$\text{Attention } A_m = \text{softmax}(Q_m K_m^T / \sqrt{d_m}) \qquad \text{Equation 1}$$

$$F_{P_m} = A_m V_m \qquad \text{Equation 2}$$

$$Q_m = F_p W_{Q_m}, K_m = F_p W_{K_m}, V_m = F_p W_{V_m} \qquad \text{Equation 3}$$

$$F_p = \text{Concat}(F_{P_1}, F_{P_2}, \dots, F_{PM}) \qquad \text{Equation 4}$$

Here, m denotes a number of attention heads, and parallel computation attention tasks may be performed in multiple heads, in a multihead self-attention model, e.g., of the fusion model. In each head, an attention map $A_m$ may be calculated between respective local features of a projected embedding space. The attention map may be multiplied by $V_m$ (value) to obtain an enhanced point cloud feature of a corresponding instance, e.g., resulting in each respective head point cloud $F_{p(1\ thru\ m)}$. Thus, an object structure $F_p$ may be fully modeled by concatenating features of each head in each head point cloud $F_{p(1\ thru\ m)}$.

In addition, $Q_m$ denotes a determined query vector, $K_m^T$ denotes a determined key vector, and $V_m$ denotes a determined value vector, based on the feature results of the point cloud feature network. $W_{Qm}$, $W_{Km}$, and $W_{Vm}$ denote weight coefficients of the query vector, the key vector, and the value vector, respectively. T and d denote determined or predetermined parameters related to the attention calculation. In an example, the softmax( ) function may be implemented as an activation function of the self-attention model, for example. In an example, a corresponding softmax( ) function may be implemented as an activation function of the cross-attention model, for example. In an example, the multi-head self-attention model including the self-attention may include normalization layer(s), e.g., identified as the addition and standard layer network in FIG. 3D subsequent to the self-attention model/network, provided the feature structure $F_p$.

To enhance a 3D representation of RGB features of relationship perception, adaptively selecting relative RGB features of a corresponding point cloud may be taken into consideration. Since RGB-D images are aligned, RGB features corresponding to each point may be obtained by observing a point position of an object. When a correlation model between RGB features and point cloud features is established, a multihead cross-attention scheme may also be adopted and implemented. For example, a 3D point cloud may be used to sample low-level pixel-level RGB features of multiple scales to a point level, e.g., from a larger receptive field of many or all pixels to a smaller or smallest receptive field, e.g., of one pixel. Subsequently, multi-scale features may be spliced and a shared MLP may be applied to perform compression to the same feature dimension as that of the point cloud feature, e.g., to generate $F_{r\_RGB}$ for provision to the cross-attention model network of FIG. 3D. Since points are scarce, a max pooling operation may be used on a RGB feature map of each pixel to aggregate context features before an aggregation operation, when contextual cues are from neighboring pixels. In an example, the MLP sharing layer in the RGB network of FIG. 3D may include fully-connected feedforward layer(s).

For example, the cross-attention model may generate $F_r$ according to Equation 5 shown below.

$$F_r = \text{Multihead Attention}(F_p, F_{r\_RGB}) \qquad \text{Equation 5}$$

The multihead cross-attention task is similar to the above-described self-attention calculation, but inputs to the cross-attention model are slightly different because a point-level RGB feature $F_{r\_RGB}$, as a non-limiting example, generated by the RGB network may be used to provide the key and value, and the point cloud feature $F_p$ resulting from the self-attention model may be used as the query.

Each element of attention learned in this cross-attention task may represent a relationship score between appearance features of an i-th point and geometric features of a j-th point. A higher correlation may indicate an increase in contribution of appearance features corresponding to a pre-determined point. Thus, the learned correlation may be used as an indication to highlight an important appearance feature.

$F_r$ and $F_p$ may be spliced and supplied to a feedforward network (FFN) including a linear transformation layer, to obtain a full multimodality feature of an object instance. In an example, the FFN may include fully-connected layer(s).

For example, a predicted point cloud of an object structure may be obtained by Equation 6 shown below.

$$F_{p\_Fused} = \text{FFN}(F_p + F_r) \qquad \text{Equation 6}$$

In an example, $F_{p\_Fused}$ may result from a normalization of the results of the feedforward network, e.g., the addition and standard layer of FIG. 3D provided results of the feedforward network subsequent to the cross-attention model.

Accordingly, in an example, two different multi-attention models may be used to generate fused results using 3D features from points and RGB features. Processing of a feature fusion by an RGB-D fusion model may enhance geometric features with rich semantic appearance features, and also explore global structural information. In such a way, a multi-modality fusion network may enhance learning of geometric representations based on local and global multimodality information, to realize an accurate pose estimation.

For example, in operation B4, the fused feature information may be generated by fusing features according to the point cloud voxel feature information, the voxel position feature information, and/or the first image voxel feature information, based on the attention mechanism, and may include one of the following operations B41 through B44:

In operation B41, for the first image voxel feature information and feature information output after processing the voxel position feature information, the point cloud voxel feature information, and the first image voxel feature information based on the attention mechanism, fused feature information may be generated by fusing features through a cross-attention mechanism.

For example, as shown in FIG. 5, the self-attention model may use the voxel position feature information and feature information obtained after splicing the point cloud voxel feature information and the first image voxel feature information as inputs, and may output the processed feature information to the cross-attention model. The cross-attention model may use a first image voxel feature and the feature information output from the self-attention model as inputs.

Figure 8:
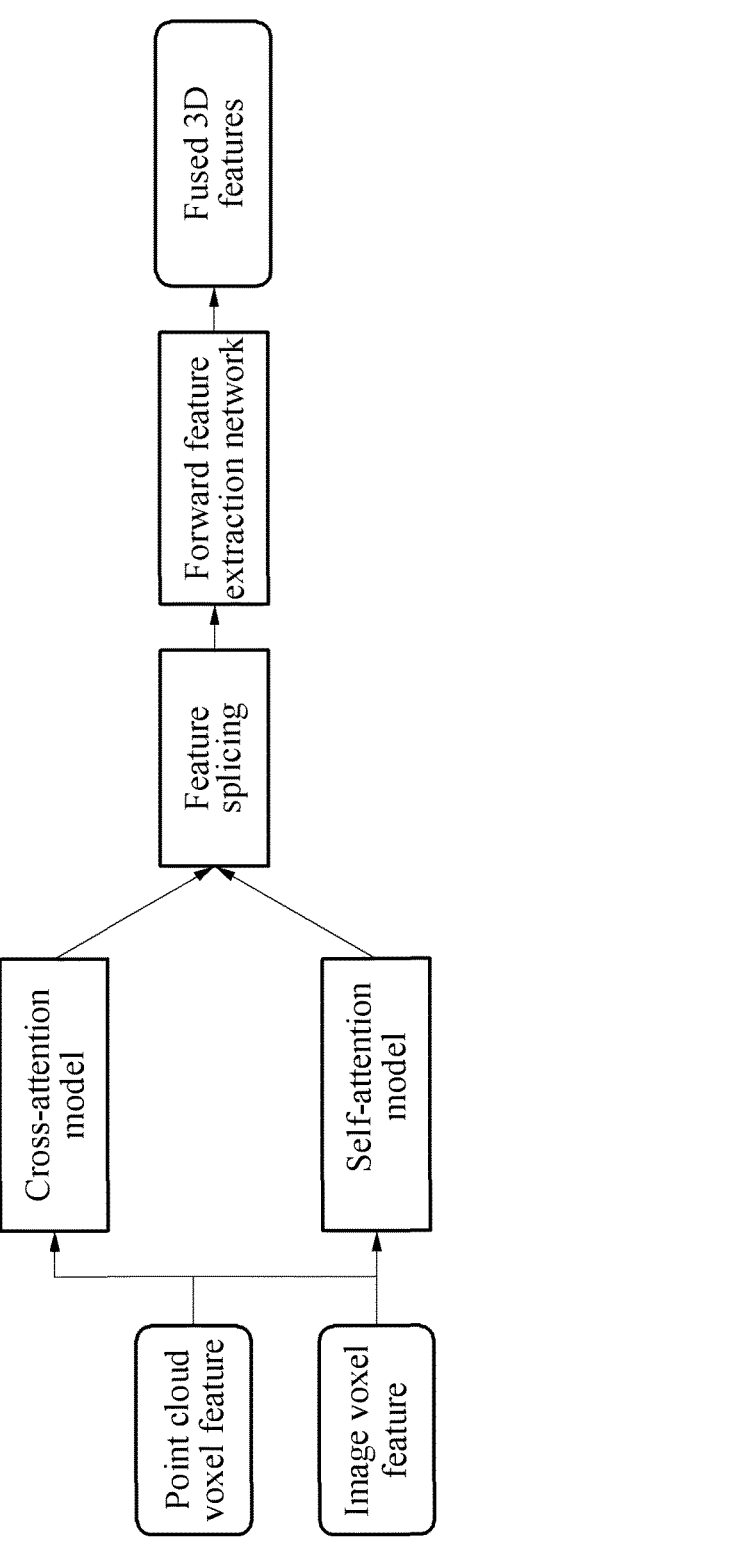
FIG. 8 illustrates an example attention mechanism, according to one or more embodiments.

In an example, if the cross-attention model fuses the inputs, fused features may be input to a forward feature extraction network/model for processing, e.g., the illustrated feedforward network subsequent to the cross-attention model/network of any of FIGS. 3D, 5, and 8, as non-limiting examples, and fused feature information may be output.

In operation B42, for the first image voxel feature information and feature information output after processing the point cloud voxel feature information based on the attention mechanism, fused feature information may be generated by fusing features through the cross-attention mechanism.

Figure 6:
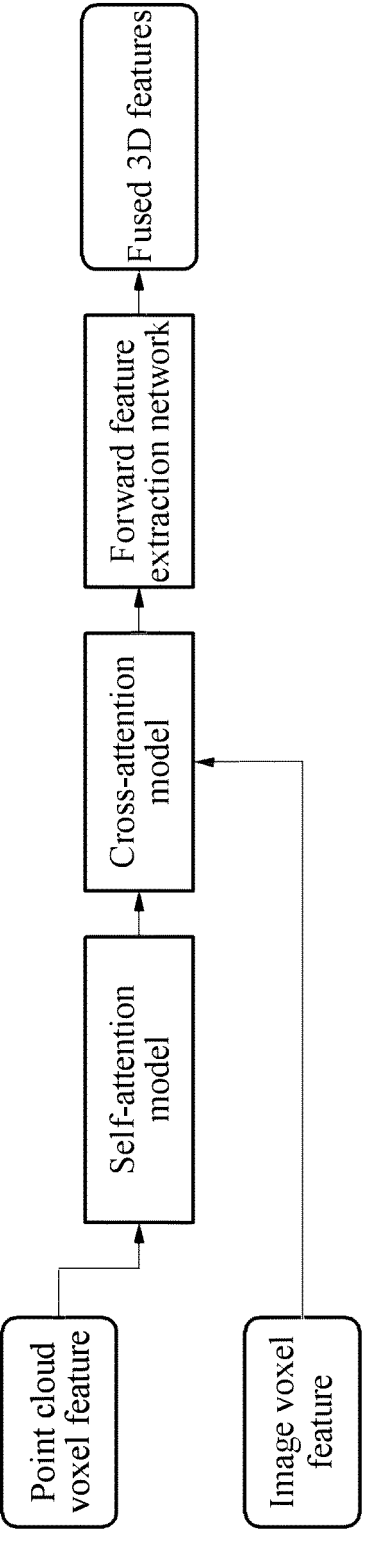
FIG. 6 illustrates an example attention mechanism, according to one or more embodiments.

For example, as shown in FIG. 6, the self-attention model may use a point cloud voxel feature as an input and may output processed feature information to the cross-attention model. The cross-attention model may use the first image voxel feature and the feature information output from the self-attention model as inputs.

In an example, an output of the cross-attention model may be input to the forward feature extraction network/model, to finally output the fused feature information.

In operation B43, for the first image voxel feature information and feature information output after processing the point cloud voxel feature information based on the cross-attention mechanism, fused feature information may be generated by fusing features through the self-attention mechanism.

Figure 7:
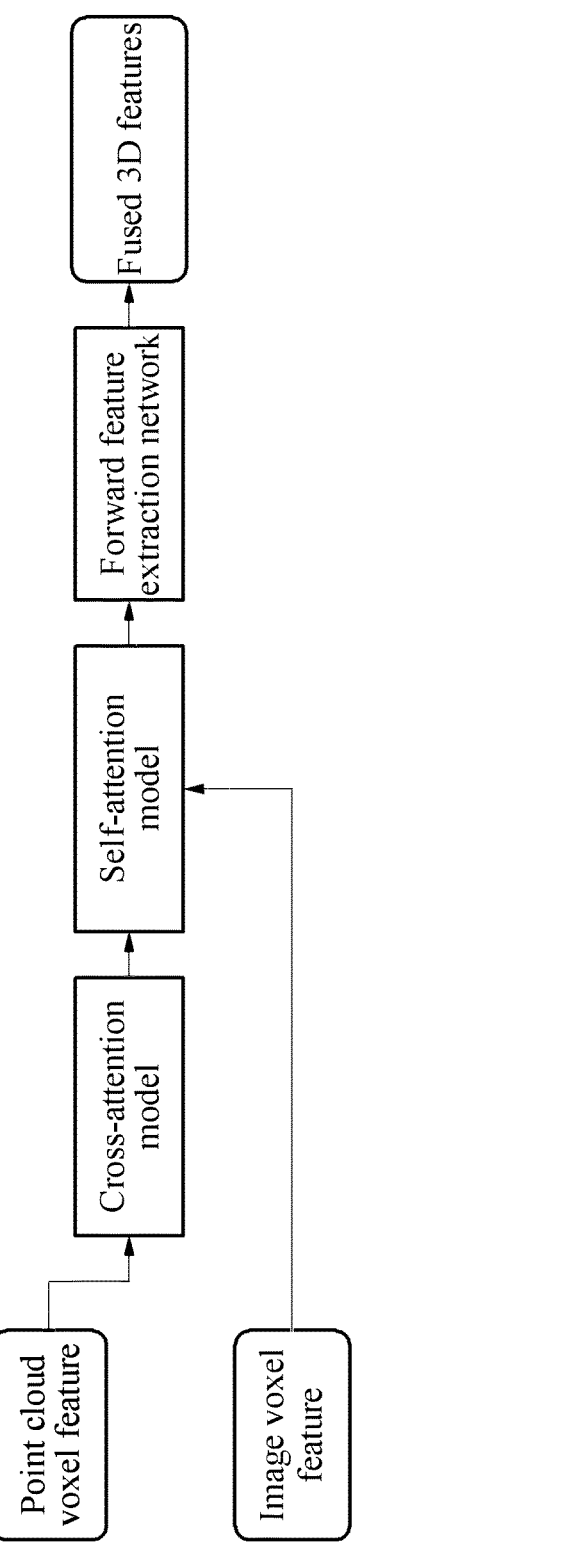
FIG. 7 illustrates an example attention mechanism, according to one or more embodiments.

For example, as shown in FIG. 7, the cross-attention model may use a point cloud voxel feature as an input and may output processed feature information to the self-attention model. The self-attention model may use the first image voxel feature and feature information output from the cross-attention model as inputs.

In an example, an output of the self-attention model may be input to the forward feature extraction network/model. In an example, the forward feature extraction network/model may include a fully-connected feedforward model to finally generate the fused feature information.

Alternatively, in operation B44, for feature information output after processing the first image voxel feature information based on the self-attention mechanism, and feature information output after processing the point cloud voxel feature information and the first image voxel feature information based on the cross-attention mechanism, fused feature information may be generated by fusing the features.

For example, as shown in FIG. 8, the cross-attention model may use a point cloud voxel feature and a first image voxel feature as inputs, and the self-attention model may use the first image voxel feature as an input.

In an example, the feature information output from the cross-attention model and the feature information output from the self-attention model may be input to the fully-connected feedforward feature extraction network/model after features are spliced, to finally output the fused feature information.

The cross-attention model may have two input features that may be processed as a key or a query, respectively. In an example, a feature mapping scheme of two attention models may adopt an MLP scheme, or adopt a graph convolution-based scheme to perform modeling of structural information between voxels. In an example, the MLP scheme may include fully-connected feedforward layer(s). In an example, N attention models (e.g., each including both the cross-attention and self-attention models) are processed, and fused 3D features (fused feature information) may be output through the forward feature extraction network/model, and may be used as a feature input of an image processing model (also referred to as a prediction model).

In an example, operation S103 of performing image processing based on the fused feature information may include at least one of the following operations C1 and C2:

In operation C1, a pose estimation and/or size estimation may be performed based on the fused feature information.

For example, a direction of a 3D target object may be determined for the pose estimation. In an embodiment, a spatial pose estimation of an object may be realized by characterizing a structure and shape of the object based on the fused feature information, by extracting object features, and by establishing a correspondence between a model and an image. After the pose estimation, a six-degrees of freedom (6 DoF) pose such as 3D rotation and 3D translation may be output.

For example, the size estimation may be used to estimate an actual size of an object. After the size estimation, a 3D size of the object may be output.

FIG. 11C illustrates an effect displayed after the pose estimation and size estimation.

In an example, when the pose estimation and/or size estimation is performed, processing may be performed in combination with 3D feature information, in addition to processing based on the fused feature information, to more effectively recognize a 3D space.

In operation C2, a shape reconstruction and/or segmentation may be performed based on the fused feature information.

For example, the shape reconstruction and segmentation may be performed by a shape decoder. In an example, a processing flow of the shape decoder may be used as a branch of an auxiliary task. After processing based on the fused feature information, a shape reconstruction result and an object segmentation result may be output.

In an example, operation C1 of performing the pose estimation and/or size estimation based on the fused feature information may include operations C11 to C13.

In operation C11, a 3D object detection may be performed based on the fused feature information to determine detection information of each object.

Figure 9:
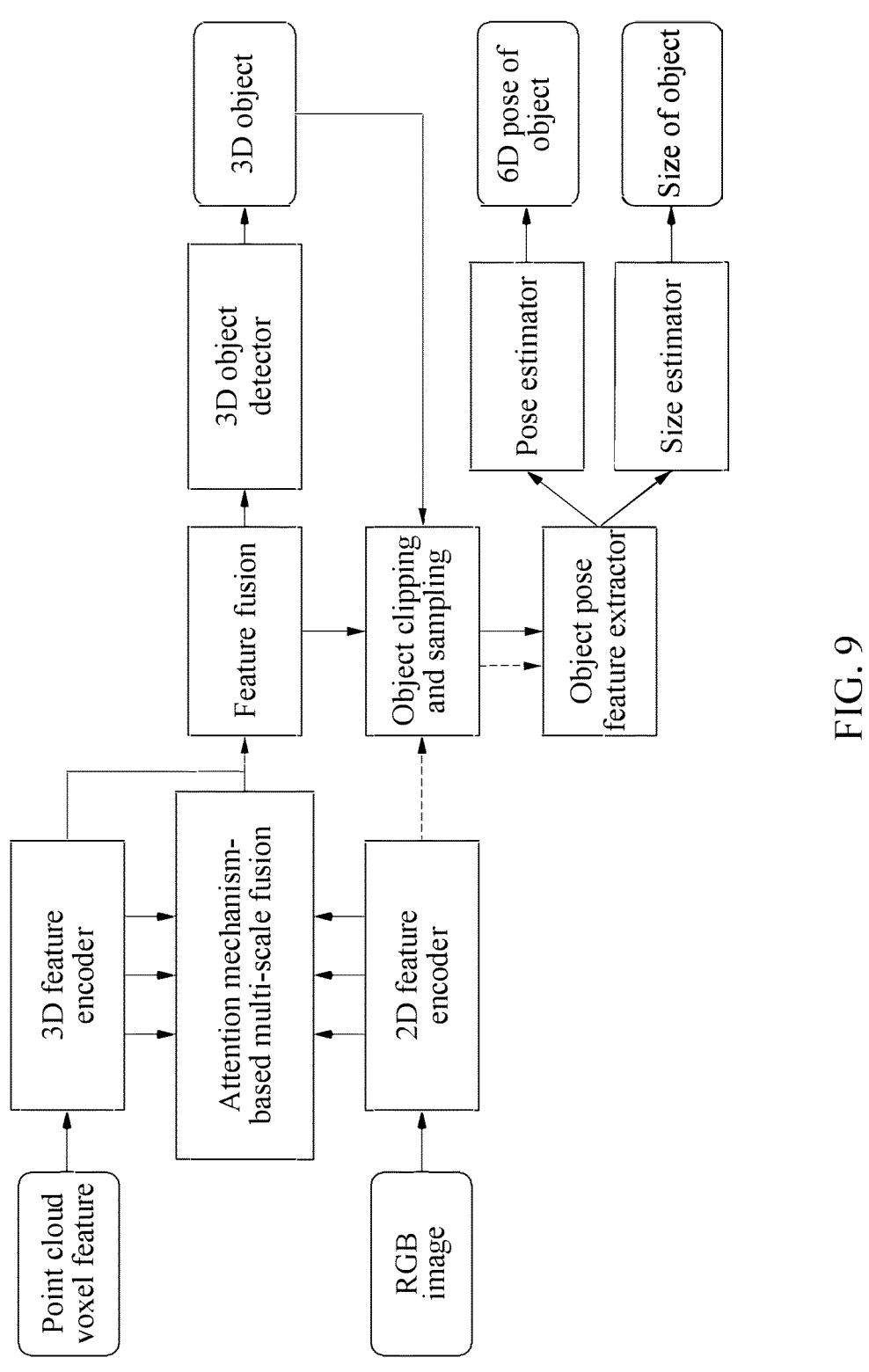
FIG. 9 illustrates an example end-to-end object pose estimation with multi-modality fusion, according to one or more embodiments.

For example, as shown in FIG. 9, in performing an object pose estimation, an RGB-D image of the entire image may be used as an input to a 2D feature encoder.

Here, if point cloud data is extracted, there may be no need to detect an input image using an object detector to obtain an object region, and an end-to-end model may be used to capture a relationship between global spatial scenario context and objects, instead of processing only a spatial relationship of a single object.

For example, the fused feature information generated by a multi-scale fusion based on the attention mechanism may first detect a 3D object in a scenario through a 3D object detector. The 3D object detector may perform positioning of a 3D object and identify object categories. In an example, the 3D object detector may include multiple transformer models to learn a spatial relationship of objects in a scenario.

In operation C12, the fused feature information may be clipped and sampled based on the detection information, to generate a 3D object feature.

For example, fused feature information may be clipped based on a detected 3D object and sampled as a general 3D object feature.

In operation C13, the pose estimation and/or size estimation may be performed based on the 3D object feature.

The detection information may include position information and category information.

In an example, operation C13 of performing the pose estimation and/or size estimation based on the 3D object feature may include operations C131 and C132.

In operation C131, the 2D feature information may be projected, clipped, and sampled, and a conversion to second image voxel feature information matching a space corresponding to the fused feature information may be performed.

For example, as indicated by a dashed line in FIG. 9, 2D feature information may be projected to a 3D space, and image voxel features matching a space in which the fused feature information is located may be clipped and sampled to be processed.

In operation C132, the pose estimation and/or size estimation may be performed based on a feature obtained by splicing the 3D object feature and the second image voxel feature information.

For example, the second image voxel feature information generated in operation C131 may be combined with the fused feature information after clipping and sampling, to perform an object pose estimation and size estimation.

The feature information after clipping and sampling may be used as an input of an object pose feature extractor. Extracted features may be input to a pose estimator and a size estimator, and 6D poses and 3D size of an object may be output. In an example, the object pose feature extractor may include a plurality of transformer models to further learn a partial relationship between objects.

In an example, operation C2 of performing the shape reconstruction and/or segmentation based on the fused feature information may include the following operation C21:

In operation C21, the shape reconstruction and/or segmentation may be performed based on the fused feature information to generate reconstructed shape information and/or segmentation information.

Figure 10:
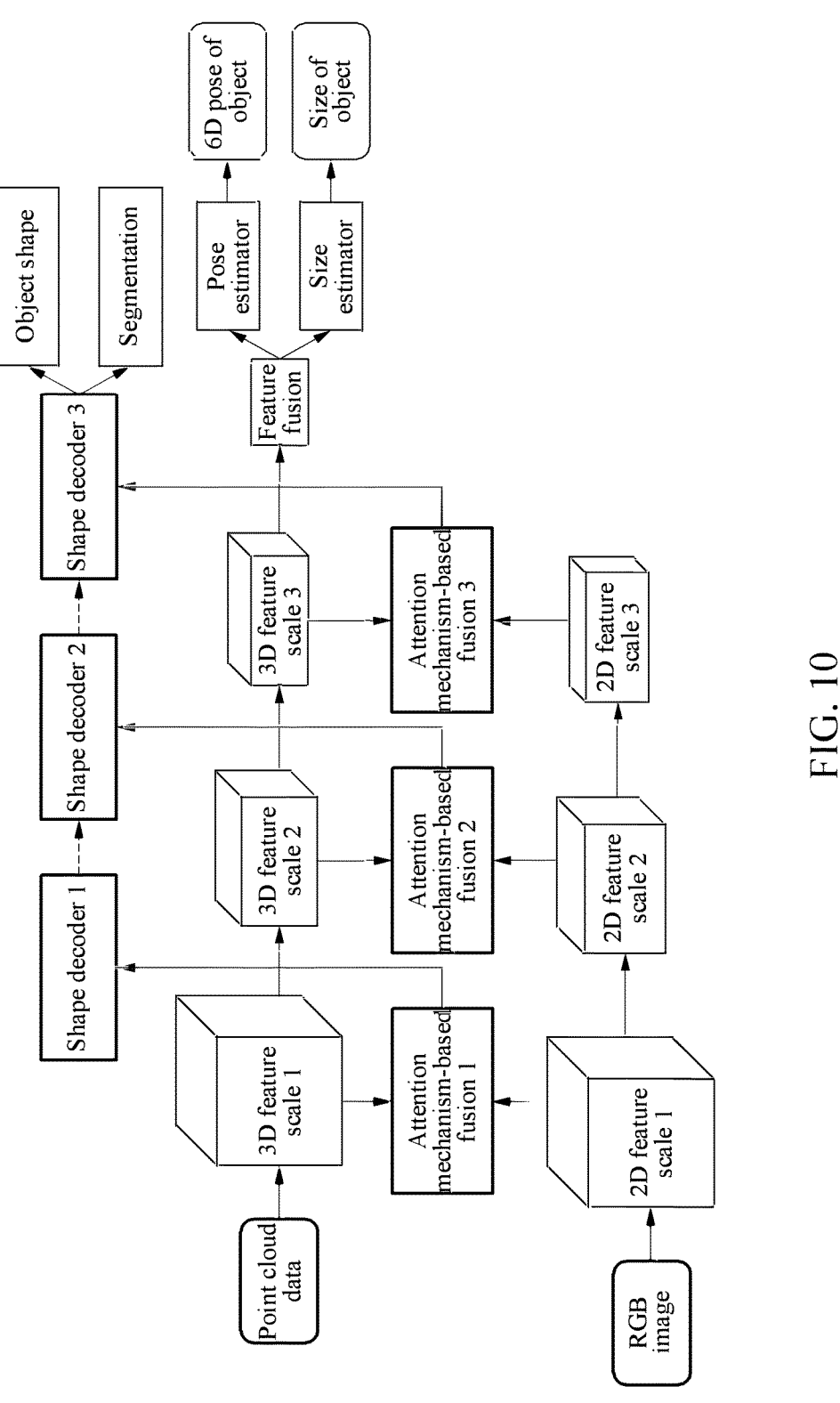
FIG. 10 illustrates an example pose estimation for a joint object shape reconstruction and segmentation task, according to one or more embodiments.

For example, when multi-scale features are proposed, the shape reconstruction and segmentation can be realized using a cascaded decoder. As shown in FIG. 10, an example in which three scales are included will be described. Fused feature information of three scales may be used as inputs of three shape decoders. For example, a shape decoder 1 may have an input of fused feature information of scale 1 only, an input of a shape decoder 2 may include an output of the shape decoder 1 and fused feature information of scale 2, and an input of a shape decoder 3 may include an output of the shape decoder 2 and fused feature information of scale 3. The shape decoder 3 may be used as a last shape decoder, and an output shape and a segmentation result may be used as a final ARF-Net output result.

In an example, FIG. 3B illustrates an example structure-aware attention fusion network for a space dependence and structural details between regions. Here, object shape reconstruction and segmentation may be used to guide an internal structure of a network learning object as a branch of auxiliary tasks. As shown in FIG. 3B, when a main pose estimation task is performed in image processing, the pose estimation and size estimation may be performed based on the fused feature information and 2D feature information.

In one or more examples, and as shown in FIGS. 3C and 3D, when an auxiliary task to be performed based on the result of the fusion is taken into consideration, a reliability of the shape reconstruction may be gradually increased, and a shape deviation may be reduced. By adding a branch, multimodality features learned by a backbone pose estimation network may be more robust to understanding of an object shape within a class, and may learn more discriminative features of an object pose and size. In an example, a branch corresponding to a shape encoder may be selectively used as an auxiliary task in an example. For example, in some scenarios, if there is no need to output an object shape and segmentation result, a corresponding branch calculation may be ignored during a network inference so that an efficiency of system processing may be guaranteed.

As shown in FIGS. 3C and 3D, N represents a number of used ARF models, and may be, for example, "3." Instance segmentation may be realized through MaskRCNN.

An ARF-Net according to an example may be used for an RGB-D-based class level 6D pose estimation. For example, a fusion model based on a structure-aware attention used to capture a space dependency and structural details may be used for fusing point cloud feature information and RGB feature information. An auxiliary task branch for a shape reconstruction and image segmentation may be further included in the ARF-Net to more efficiently guide the internal structure of the network learning object and to enhance an accuracy and efficiency of network processing. The ARF-Net may also be applied as an end-to-end attention fusion network for a class-level 6D pose and size estimation.

Figure 12:
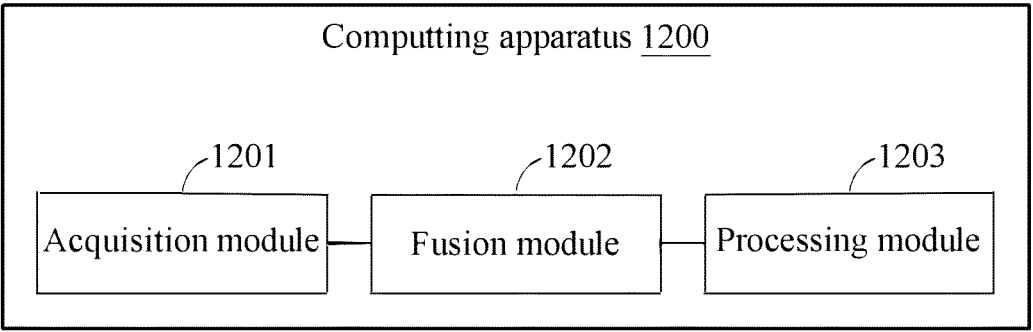
FIG. 12 illustrates an example computing apparatus, according to one or more embodiments.

As discussed herein, a computing apparatus may be provided. For example, Referring to FIG. 12, a computing apparatus 1200 may include a fusion module 1202. As a non-limiting example, the computing apparatus 1200 may further include an acquisition module 1201 that may include hardware storage(s) and/or image capturing devices, e.g., receiving 3D and 2D image information from an internal or exterior transceiver or communication bus or internal or exterior camera(s), as non-limiting examples. The acquisition module 1201 may further include a processor configured to control such acquisition of 3D and 2D image information, as well as respectively generate other 3D and 2D information based on such 3D and 2D image information. The fusion module 1202 may include a processor that is configured to implement each of the models described herein with respect to at least the feature extraction and fusion operations, as non-limiting examples. The computing apparatus 1200 may further include a processing module 1203 that may be another hardware module including a processor configured to perform any one, combination, or all described image processing operations described herein. The processing module 1203 may be further configured to perform any additional operations described herein that are dependent on fused features generated by the fusion module 1202. Examples include where any combination the example described processors of the acquisition module 1201, the fusion module 1202, and the processing module 1203 are a same processor.

The acquisition module 1201 may generate 3D feature information and 2D feature information based on a color image and a depth image, the fusion module 1202 may generate fused feature information by fusing the 3D feature information and the 2D feature information based on an attention mechanism using a fusion model, and the processing module 1203 may perform image processing, e.g., based on an image processing model, that considers the fused feature information.

In an example, the fusion module 1202 may be configured to generate the fused feature information by fusing the 3D feature information and the 2D feature information based on the attention mechanism, by fusing 3D feature information of one or more scales and 2D feature information of one or more scales based on the attention mechanism. For example, the one or more scales of the 3D feature information may be the same scales of the 2D feature information.

For example, the feature module 1202 may be configured to generate the fused feature information of a current scale by performing a feature fusion on 3D feature information of the current scale and 2D feature information of the current scale based on the attention mechanism, the 3D feature information of the current scale being determined based on fused feature information of a previous scale and 3D feature information of the previous scale, and the 2D feature information of the current scale being determined based on 2D feature information of the previous scale.

In another example, the feature module 1202 may be configured to, when the fused feature information is generated by fusing the 3D feature information and the 2D feature information based on the attention mechanism generate point cloud voxel feature information and/or voxel position feature information based on the 3D feature information, generate first image voxel feature information based on the 2D feature information, and generate fused feature information by fusing features according to the point cloud voxel feature information, the voxel position feature information, and/or the first image voxel feature information, based on the attention mechanism.

In an example, when the fused feature information is generated by fusing features according to the point cloud voxel feature information, the voxel position feature information, and/or the first image voxel feature information based on the attention mechanism, the fusion module 1202 may be configured to generate fused feature information by fusing features using a cross-attention mechanism, for the first image voxel feature information and feature information output after processing the voxel position feature information, the point cloud voxel feature information, and the first image voxel feature information based on the attention mechanism, generate fused feature information by fusing features using the cross-attention mechanism, for the first image voxel feature information and feature information output after processing the point cloud voxel feature information based on the attention mechanism, generate fused feature information by fusing features using a self-attention mechanism, for the first image voxel feature information and feature information output after processing the point cloud voxel feature information based on the cross-attention mechanism, and/or generate fused feature information by fusing features for feature information output after processing the first image voxel feature information based on the self-attention mechanism and feature information output after processing the point cloud voxel feature information and the first image voxel feature information based on the cross-attention mechanism.

In an example, the processing module 1203 may be configured to perform a pose estimation and/or size estimation based on the fused feature information, and/or a shape reconstruction and/or segmentation based on the fused feature information.

In an example, when the processing module 1203 is configured to perform the shape reconstruction and/or segmentation based on the fused feature information, the processing module 1203 may be configured to generate reconstructed shape information and/or segmentation information by performing the shape reconstruction and/or segmentation based on the fused feature information.

The computing apparatus 1200 according to various examples may be configured to perform any one, any combination, or all operations and methods described herein. For example, operations respectively performed by each hardware module of the computing apparatus 1200 according to various examples may correspond to operations of above respectively described methods according to examples. For detailed description of configuration and implementation of each model of/by the computing apparatus, reference may be made to the above description of corresponding operations and methods, and accordingly further description is not repeated herein.

According to an example, the computing apparatus 1200 may include one or more processors and one or more memories configured to store instructions, which when executed by the processor may configure the processor to perform one, one or more, or all operations or methods described herein. For example, in an example, each of at least the fusion module 1202 and the processing module 1203 of the computing apparatus 1200 may be representative of the aforementioned respective processors and memories.

In an example, the computing apparatus 1200 may be an electronic device, the electronic device may include the computing apparatus, or the electronic device may be configured without one or more modules of the described modules of the computing apparatus 1200, whose operations may alternatively be performed by one or more processors of the electronic device. For example, any one or more processors of the electronic device may execute instructions to implement operations of image processing methods described herein, while the computing apparatus of the electronic device may perform the fusion operations through the fusion module 1202. In an example, for an input image, 3D feature information and 2D feature information of at least one scale may be first generated based on a color image and a depth image of the input image, and fused feature information may be generated by fusing the 3D feature information and the 2D feature information. Here, the features may be fused by an attention mechanism. In addition, an image may be processed based on the fused feature information. By implementing the corresponding method, multimodality fused feature information may be generated through the feature fusion. Thus, image processing based on multimodality information may be realized. Compared to image processing based on single modality information, the electronic device according to an example may provide enhanced accuracy of image processing. In addition, for example, in an AR device example of the electronic device, the electronic device may enhance a processing efficiency and robustness of a corresponding system by increasing an ability to recognize 3D information and project 3D information in such respective operations of the AR device. The electronic device may further include any or any combination of one or more cameras, displays, user input/output devices.

Figure 13:
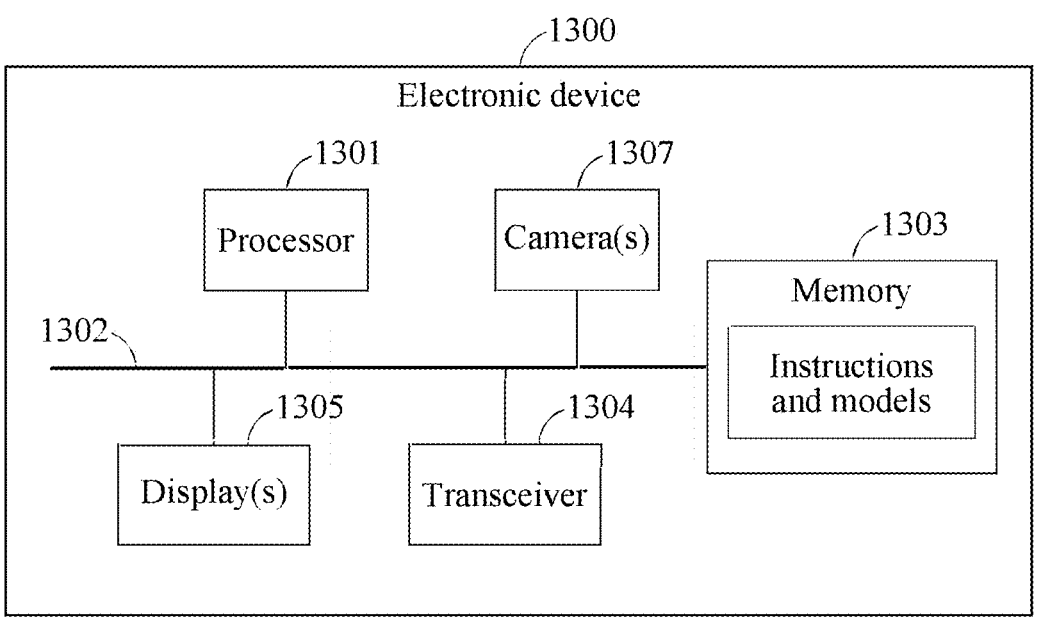
FIG. 13 illustrates an example electronic device, according to one or more embodiments.

Referring to FIG. 13, an electronic device 1300 may include a processor 1301 and a memory 1303, e.g., one or more processors 1301 and one or memories 1303. The processor 1301 may be connected to the memory 1303 via, for example, a bus 1302. The memory 1303 may store all of the models described herein, including an example where all models are stored in the memory 1303. In an example, the electronic device 1300 may further include one or more transceivers 1304. The transceiver 1304 may be used for a data interaction between the electronic device 1300 and another electronic device, such as a data transmission and/or data reception. A structure of the electronic device 1300 is not limited to examples of the present disclosure. In addition, while the described modalities are described as 3D depth information and 2D image information, examples are not limited thereto.

The processor 1301 may be, for example, a CPU, a general-purpose processor, a digital signal processor (DSP), an application-specific integrated circuit (ASIC), a field-programmable gate array (FPGA), other programmable logic devices, a transistor logic device, another hardware component, or any combination thereof. Various examples of logical blocks, modules, and circuits described in the present disclosure may be implemented or executed by the processor 1301 including, receiving, or obtaining instructions which configure the processor 1301 to perform the operations of such logical blocks, modules, and circuits. The processor 1301 may also realize different computing functions described herein, for example, through a combination of one or more microprocessors, or a combination of a DSP and a microprocessor, as non-limiting examples.

The bus 1302 may include a path for transferring information between the above-described components. The bus 1302 may be a peripheral component interconnect (PCI) bus or an extended industry standard architecture (EISA) bus. The bus 1302 may be divided into an address bus, a data bus, a control bus, and the like. For convenience of description, only one thick line is illustrated in FIG. 13, however, examples are not limited to a single bus or one type of bus.

The memory 1303 may be a read-only memory (ROM) or other types of static storage devices capable of storing static information and instructions, a random access memory (RAM) or other types of dynamic storage devices capable of storing information and instructions, an electrically erasable programmable read-only memory (EEPROM), a compact disc (CD)-ROM or other optical disc storages, an optical disc storage (e.g., a compressed optical disc, a laser disc, an optical disc, a digital versatile disc, a Blu-ray disc, etc.), disk storage media, other magnetic storage devices, or any other medium that may be used to carry or store computer programs and may be read by a computer, but is not limited thereto.

As noted, processor 1301 may be configured to execute instructions. For example, the memory 1303 may store instructions, which when executed by processor 1301 configure the processor 1301 to execute any one, any combination, or all operations and methods described herein.

The electronic device 1300 may be, but is not limited to, for example, a smartphone, a tablet computer, a notebook computer, a smart speaker, a smartwatch, an in-vehicle device, and the like. For example, the electronic device 1300 may further include one or more displays 1305 and/or one or more cameras 1307. For example, the cameras may include one or more 2D image cameras and one or more depth cameras, and may further include a 3D camera that captures 2D images and generates corresponding depth images. For example, the 3D camera may capture an RGB-D image.

One or more examples disclosed herein may provide a non-transitory computer-readable storage medium in which the aforementioned instructions are stored.

In an example, the electronic device may generate a pose using a machine learning pose estimation model.

In an example, the electronic device may generate data for identifying an image or an image feature in the image using image data or video data as input data of the machine learning model. Examples also include the generating of the AI model, e.g., a machine learning model, through training operations using training data, for example. Here, such training operations may refer to the generation of the example machine learning model or the execution of pre-defined operation rules configured to control and/or perform a desired feature (or objective) by training a an initialized, pre-trained, or otherwise basic trained, as non-limiting example, machine learning model with a plurality of pieces of training data through a training algorithm. As a non-limiting example, a learning or training algorithm may include method(s) of training a predetermined target device (e.g., a robot) based on a plurality of pieces of training data, to a desired accuracy and/or efficiency, as non-limiting examples, resulting in the target device implementation of a trained AI model, e.g., a machine learning model, to perform respective inference operations of any of the models described herein. The learning algorithm may include, but is not limited to, for example, supervised learning, unsupervised learning, semi-supervised learning, or reinforcement learning. In an example, all models described herein are respective machine learning models.

Each of the machine learning model may be or include a plurality of neural network layers. Each of the plurality of neural network layers may include a plurality of weight values, and neural network operations may be performed based on weight-based calculation results from a previous layer, a subsequent layer, and/or a current layer. Such layer calculations may include consideration of an attention generated by one or more of the neural network layers or another network, as well as the generation of such attention. A neural network, as an example of the machine learning model, may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a generative adversarial network (GAN), and/or a deep Q network, but is not limited thereto.

Examples herein may perform, e.g., based on the fused features or generated predicted pixel cloud information with geometric and gray-scale or color appearance information, visual understanding is a technique of computer recognizing and processing of objects, and may include, for example, object recognition, object tracking, image search, human recognition, scenario recognition, 3D reconstruction/positioning, or image enhancement.

The processor may include one or more processors, e.g., a reference to a processor, at least one processor, or one or more processors may each refer to one or more local and/or distributed processors. The one or more processors may be, for example, general-purpose processors (e.g., a central processing unit (CPU) and an application processor (AP), etc.), or graphics-dedicated processors (e.g., a graphics processing unit (GPU) and a vision processing unit (VPU)), and/or AI-dedicated processors (e.g., a neural processing unit (NPU)).

It should be understood that although respective operations are indicated by arrows in various flowcharts according to the examples, an execution order of respective operations are not limited to an order indicated by the arrows. Thus, unless explicitly stated herein, implementation of operations in each flowchart may be performed in other orders according to requirements, in some implementation scenarios. In addition, some or all of the operations in the flowcharts may include a plurality of sub-operations or stages, e.g., based on actual implementation scenarios. Some or all of the sub-operations or stages may be performed at the same time, and sub-operations or stages of each of the sub-operations or stages may be performed at different times. In scenarios with different execution times, an execution order of the sub-operations or stages may be flexibly configured according to requirements, and examples of the present application are not limited thereto.

The computing apparatuses, the electronic devices, the processors, the memories, image cameras, depth cameras, image and depth cameras, acquisition module, fusion module, processing module, the displays, the storage devices, and other apparatuses, devices, units, modules, and components described herein with respect to FIGS. 1-13 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method performed by a computing apparatus, the method comprising:
   generating three-dimensional (3D) feature information and two-dimensional (2D) feature information based on a color image and a depth image;
   generating fused feature information by fusing the 3D feature information and the 2D feature information based on an attention mechanism; and
   performing at least one of estimating a six-dimensional (6D) pose of an object, estimating a size of the object, reconstructing a shape of the object, or segmenting the object based on the fused feature information,
   wherein the attention mechanism includes a self-attention mechanism and cross-attention mechanism,
   wherein the fused feature information is generated by fusing the 3D feature information of at least one scale and the 2D feature information of at least one scale, and
   wherein the generating of the fused feature information comprises, for the 3D feature information of one scale and the 2D feature information of one scale, generating fused feature information of a current scale by performing a feature fusion on 3D feature information of the current scale and 2D feature information of the current scale based on the attention mechanism, the 3D feature information of the current scale being determined based on fused feature information of a previous scale and 3D feature information of the previous scale, and the 2D feature information of the current scale being determined based on 2D feature information of the previous scale.

2. The method of claim 1, wherein the generating of the fused feature information comprises:
   acquiring point cloud voxel feature information and/or voxel position feature information based on the 3D feature information;
   generating first image voxel feature information based on the 2D feature information; and
   performing the generating of the fused feature information based on the point cloud voxel feature information, the voxel position feature information, and/or the first image voxel feature information, based on the attention mechanism.

3. The method of claim 2, wherein the performing of the generating of the fused feature information based on the point cloud voxel feature information, the voxel position feature information, and/or the first image voxel feature information, based on the attention mechanism comprises one of:

generating the fused feature information by fusing features using the cross-attention mechanism that is dependent on the first image voxel feature information and feature information output by the self-attention mechanism, that is dependent on the voxel position feature information, the point cloud voxel feature information, and the first image voxel feature information; or generating the fused feature information by fusing features using the cross-attention mechanism that is dependent on the first image voxel feature information and another feature information output by the self-attention mechanism, that is dependent on the point cloud voxel feature information.

4. A non-transitory computer-readable storage medium storing instructions that, when executed in one or more processors of the computing apparatus, configure the one or more processors to perform the method of claim 1.

5. An apparatus comprising:

one or more processors comprising processing circuitry;

memory comprising one or more storage media storing instructions that, when executed by the one or more processors individually or collectively, cause the apparatus to:

generate three-dimensional (3D) feature information based on a depth image;

generate two-dimensional (2D) feature information based on a color image;

fuse the 3D feature information and the 2D feature information using an attention mechanism to generate fused feature information; and perform at least one of an estimation of a six-dimensional (6D) pose of an object, an estimation of a size of the object, a reconstruction of a shape of the object, or a segmenting of the object based on the fused feature information,

wherein the attention mechanism includes a self-attention mechanism and cross-attention mechanism, wherein the fused feature information is generated through a fusing of the 3D feature information of at least one scale and the 2D feature information of at least one scale, and wherein the generation of the fused feature information comprises, for the 3D feature information of one scale and the 2D feature information of one scale, generation of fused feature information of a current scale by performing a feature fusion on 3D feature information of the current scale and 2D feature information of the current scale based on the attention mechanism, the 3D feature information of the current scale being determined based on fused feature information of a previous scale and 3D feature information of the previous scale, and the 2D feature information of the current scale being determined based on 2D feature information of the previous scale.

6. The apparatus of claim 5, wherein the instructions, when executed by the one or more processors individually or collectively, further cause the apparatus to:

generate point cloud voxel feature information and/or voxel position feature information based on the 3D feature information;

generate first image voxel feature information based on the 2D feature information; and perform the fusing of the 3D feature information and the 2D feature information based on the point cloud voxel feature information, the voxel position feature information, and/or the first image voxel feature information, based on the attention mechanism.

7. The apparatus of claim 5, wherein the apparatus is an AR device that further comprises one or more cameras configured to respectively capture the depth image and the color image, and one or more displays to display AR image information based on the predicted image information.

* * * * *